(12) United States Patent
Pelletier et al.

(10) Patent No.: US 8,730,989 B2
(45) Date of Patent: May 20, 2014

(54) METHOD AND APPARATUS FOR CLOSED LOOP TRANSMIT DIVERSITY TRANSMISSION INITIAL ACCESS

(75) Inventors: Benoit Pelletier, Roxboro (CA); Hong O. Zhang, Manalapan, NJ (US); Diana Pani, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 141 days.

(21) Appl. No.: 13/370,563

(22) Filed: Feb. 10, 2012

(65) Prior Publication Data

US 2012/0207045 A1 Aug. 16, 2012

Related U.S. Application Data

(60) Provisional application No. 61/441,984, filed on Feb. 11, 2011, provisional application No. 61/481,075, filed on Apr. 29, 2011, provisional application No. 61/523,065, filed on Aug. 12, 2011.

(51) Int. Cl.
*H04B 7/216* (2006.01)

(52) U.S. Cl.
USPC .......................................... 370/441; 370/252

(58) Field of Classification Search
USPC .................................. 370/335, 342, 252, 253
See application file for complete search history.

(56) References Cited

U.S. PATENT DOCUMENTS

| | | | |
|---|---|---|---|
| 7,881,742 B2 | 2/2011 | Gholmieh et al. | |
| 7,916,681 B2 | 3/2011 | Andersson et al. | |
| 8,060,130 B2 | 11/2011 | Gholmieh et al. | |
| 2004/0248581 A1 | 12/2004 | Seki et al. | |
| 2005/0101352 A1 | 5/2005 | Logothetis et al. | |
| 2005/0152314 A1 | 7/2005 | Sun et al. | |
| 2006/0262754 A1 | 11/2006 | Andersson et al. | |
| 2007/0259682 A1 | 11/2007 | Kaikkonen et al. | |
| 2008/0043867 A1* | 2/2008 | Blanz et al. ................ | 375/260 |
| 2008/0153446 A1 | 6/2008 | Isaac et al. | |
| 2008/0200202 A1 | 8/2008 | Montojo et al. | |
| 2008/0207247 A1 | 8/2008 | Gholmieh et al. | |
| 2009/0034502 A1 | 2/2009 | Kostic et al. | |

(Continued)

FOREIGN PATENT DOCUMENTS

| | | |
|---|---|---|
| CN | 101095295 A | 12/2007 |
| WO | WO-00/72464 A1 | 11/2000 |

(Continued)

OTHER PUBLICATIONS

"3rd Generation Partnership Project; Technical Specification Group Radio Access Network; Enhanced uplink; Overall description; Stage 2 (Release 10)", 3GPP TS 25.319 V10.3.0, Dec. 2010, 79 pages.

(Continued)

*Primary Examiner* — Gary Mui
(74) *Attorney, Agent, or Firm* — Theodore Naccarella

(57) ABSTRACT

Uplink precoding in closed loop transmit diversity (CLTD). The methods and apparatus relate to precoder operations during an initial stage using default precoder tap weights, and a second stage wherein precoder weights obtained from a precoder control indicator channel information are used, provided the signal quality of the precoder control indicator channel is sufficiently reliable. The methods and apparatus also relate to procedures for responding to detection of an unreliable pre-coding control information (PCI) carried in a downlink feedback signal.

18 Claims, 14 Drawing Sheets

(56) References Cited

U.S. PATENT DOCUMENTS

| | | |
|---|---|---|
| 2009/0036081 A1 | 2/2009 | Catreux et al. |
| 2009/0086671 A1 | 4/2009 | Pelletier et al. |
| 2009/0109912 A1 | 4/2009 | Digirolamo et al. |
| 2009/0143074 A1 | 6/2009 | Pelletier et al. |
| 2009/0186624 A1 | 7/2009 | Cave et al. |
| 2009/0196230 A1 | 8/2009 | Kim et al. |
| 2009/0247161 A1 | 10/2009 | Pani et al. |
| 2009/0307558 A1 | 12/2009 | Lee et al. |
| 2010/0157956 A1 | 6/2010 | Takahashi |
| 2010/0177745 A1 | 7/2010 | Baker et al. |
| 2010/0238824 A1* | 9/2010 | Farajidana et al. ........... 370/252 |
| 2010/0246516 A1 | 9/2010 | Pelletier et al. |
| 2010/0322356 A1 | 12/2010 | Catreux-Erceg et al. |
| 2011/0098077 A1 | 4/2011 | Gholmieh et al. |
| 2011/0111790 A1 | 5/2011 | Andersson et al. |
| 2011/0149857 A1 | 6/2011 | Lee et al. |
| 2011/0206154 A1* | 8/2011 | Ding et al. ................... 375/267 |
| 2011/0243203 A1* | 10/2011 | Yamamoto et al. ........... 375/219 |
| 2011/0261833 A1* | 10/2011 | Yang ............................. 370/465 |
| 2011/0263281 A1* | 10/2011 | Cai et al. ...................... 455/501 |
| 2012/0002658 A1* | 1/2012 | Fan et al. ...................... 370/338 |
| 2012/0008510 A1 | 1/2012 | Cai et al. |
| 2012/0082192 A1* | 4/2012 | Pelletier et al. ............... 375/219 |
| 2012/0113834 A1* | 5/2012 | Hunzinger .................... 370/252 |
| 2012/0287868 A1* | 11/2012 | Sambhwani et al. ......... 370/329 |
| 2013/0182794 A1* | 7/2013 | Ringstrom et al. ........... 375/297 |

FOREIGN PATENT DOCUMENTS

| | | |
|---|---|---|
| WO | WO-00/72465 A1 | 11/2000 |
| WO | WO-2006/047909 A1 | 5/2006 |
| WO | WO-2007/137280 A2 | 11/2007 |
| WO | WO-2008/021396 A2 | 2/2008 |
| WO | WO-2010/107699 A2 | 9/2010 |

OTHER PUBLICATIONS

"3rd Generation Partnership Project; Technical Specification Group Radio Access Network; Physical layer procedures (FDD) (Release 9)", 3GPP TS 25.214 V9.1.0, Dec. 2009, 98 pages.
"3rd Generation Partnership Project; Technical Specification Group Radio Access Network; Radio Resource Control (RRC); Protocol specification (Release 10)", 3GPP TS 25.331 V10.3.0, Mar. 2011, 1,863 pages.
"International Search Report and Written Opinion", dated May 25, 2012, International Application No. PCT/US2010/024632, 14 pages.
Ericsson et al., "Initial considerations on the design for UL MIMO for HSUPA", 3GPP TSG RAN WG1 Meeting #63bis, R1-110496, Dublin, Ireland, Jan. 11, 2011, 16 pages.
Ericsson et al., "On the design of uplink closed loop transmit diversity for HSUPA", 3GPP TSG RAN WG1 Meeting #63bis, R1-110489, Dublin, Ireland, Jan. 11, 2011, 6 pages.
Ericsson et al., "Pre-Coding Selection for CLTD", 3GPP TSG RAN WG1 Meeting#63bis, R1-110488, Dublin, Ireland, Jan. 11, 2011, 3 pages.
Huawei et al., "Initial considerations on Uplink Closed Loop Transmit Diversity", 3GPP TSG RAN WG1 Meeting#63bis, R1-110309, Dublin, Ireland, Jan. 13, 2011, 5 pages.
Huawei, "New WI proposal: Uplink Transmit Diversity for HSPA", 3GPP TSG-RAN #50, RP-101428, Istanbul, Turkey, Dec. 7-10, 2010, 6 pages.
"3rd Generation Partnership Project; Technical Specification Group Radio Access Network; Evolved Universal Terrestrial Radio Access (E-UTRA); Physical layer procedures (Release 8)", 3GPP TS 36.213 V8.5.0, Dec. 2008, 74 pages.
"3rd Generation Partnership Project; Technical Specification Group Radio Access Network; Evolved Universal Terrestrial Radio Access (E-UTRA); Physical layer procedures (Release 8)", 3GPP TS 36.213 V8.8.0, Sep. 2009, 77 pages.
"3rd Generation Partnership Project; Technical Specification Group Radio Access Network; Evolved Universal Terrestrial Radio Access (E-UTRA); Physical layer procedures (Release 9)", 3GPP TS 36.213 V9.0.1, Dec. 2009, 79 pages.
"3rd Generation Partnership Project; Technical Specification Group Radio Access Network; Multiplexing and channel coding (FDD) (Release 1999)", 3GPP TS 25.212 V3.11.0, Sep. 2002, 62 pages.
"3rd Generation Partnership Project; Technical Specification Group Radio Access Network; Multiplexing and channel coding (FDD) (Release 4)", 3GPP TS 25.212 V4.6.0, Sep. 2002, 62 pages.
"3rd Generation Partnership Project; Technical Specification Group Radio Access Network; Multiplexing and channel coding (FDD) (Release 5)", 3GPP TS 25.212 V5.10.0, Jun. 2005, 72 pages.
"3rd Generation Partnership Project; Technical Specification Group Radio Access Network; Multiplexing and channel coding (FDD) (Release 6)", 3GPP TS 25.212 V6.10.0, Dec. 2006, 84 pages.
"3rd Generation Partnership Project; Technical Specification Group Radio Access Network; Multiplexing and channel coding (FDD) (Release 7)", 3GPP TS 25.212 V7.9.0, Sep. 2008, 103 pages.
"3rd Generation Partnership Project; Technical Specification Group Radio Access Network; Multiplexing and channel coding (FDD) (Release 7)", 3GPP TS 25.212 V7.11.0, Sep. 2009, 103 pages.
"3rd Generation Partnership Project; Technical Specification Group Radio Access Network; Multiplexing and channel coding (FDD) (Release 8)", 3GPP TS 25.212 V8.4.0, Dec. 2008, 107 pages.
"3rd Generation Partnership Project; Technical Specification Group Radio Access Network; Multiplexing and channel coding (FDD) (Release 8)", 3GPP TS 25.212 V8.6.0, Sep. 2009, 107 pages.
"3rd Generation Partnership Project; Technical Specification Group Radio Access Network; Multiplexing and channel coding (FDD) (Release 9)", 3GPP TS 25.212 V9.1.0, Dec. 2009, 108 pages.
"3rd Generation Partnership Project; Technical Specification Group Radio Access Network; Physical channels and mapping of transport channels onto physical channels (FDD) (Release 5)", 3GPP TS 25.211 V5.8.0, Dec. 2005, 39 pages.
"3rd Generation Partnership Project; Technical specification Group Radio Access Network; Physical channels and mapping of transport channels onto physical channels (FDD) (Release 6)", 3GPP TS 25.211 V6.9.0, Nov. 2007, 51 pages.
"3rd Generation Partnership Project; Technical Specification Group Radio Access Network; Physical channels and mapping of transport channels onto physical channels (FDD) (Release 6)", 3GPP TS 25.211 V6.10.0, Sep. 2009, 51 pages.
"3rd Generation Partnership Project; Technical Specification Group Radio Access Network; Physical channels and mapping of transport channels onto physical channels (FDD) (Release 7)", 3GPP TS 25.211 V7.6.0, May 2008, 54 pages.
"3rd Generation Partnership Project; Technical Specification Group Radio Access Network; Physical channels and mapping of transport channels onto physical channels (FDD) (Release 7)", 3GPP TS 25.211 V7.9.0, Dec. 2009, 55 pages.
"3rd Generation Partnership Project; Technical Specification Group Radio Access Network; Physical channels and mapping of transport channels onto physical channels (FDD) (Release 8)", 3GPP TS 25.211 V8.3.0, Dec. 2008, 56 pages.
"3rd Generation Partnership Project; Technical Specification Group Radio Access Network; Physical channels and mapping of transport channels onto physical channels (FDD) (Release 8)", 3GPP TS 25.211 V8.6.0, Dec. 2009, 58 pages.
"3rd Generation Partnership Project; Technical Specification Group Radio Access Network; Physical channels and mapping of transport channels onto physical channels (FDD)(Release 1999)", 3GPP TS 25.211 V3.12.0, Sep. 2002, 46 pages.
"3rd Generation Partnership Project; Technical Specification Group Radio Access Network; Physical channels and mapping of transport channels onto physical channels (FDD)(Release 4)", 3GPP TS 25.211 V4.6.0, Sep. 2002, 46 pages.
"3rd Generation Partnership Project; Technical Specification Group Radio Access Network; Physical layer procedures (FDD) (Release 8)", 3GPP TS 25.214 V8.4.0, Dec. 2008, 92 pages.
"3rd Generation Partnership Project; Technical Specification Group Radio Access Network; Physical layer procedures (FDD) (Release 8)", 3GPP TS 25.214 V8.8.0, Dec. 2009, 93 pages.
"Chinese First Office Action", Chinese Patent Application 201080012051.6, Jul. 2013, 7 pages.
"Chinese First Office Action (English Translation)", Chinese Patent Application No. 20108001251.6, Jul. 2013, 10 pages.

(56) References Cited

OTHER PUBLICATIONS

"Physical channels and mapping of transport channels onto physical channels (FDD)", 3GPP TS 25.211 9.1.0, Dec. 2009, 58 pages.
"United States Final Rejection", U.S. Appl. No. 12/723,131, Aug. 15, 2012, 44 pages.
"United States Non-Final Office Action", U.S. Appl. No. 12/723,131, Oct. 2013, 52 pages.
"United States Non-Final Office Action", U.S. Appl. No. 12/723,131, Mar. 6, 2012, 61 pages.
Motorola, "Uplink SU-MIMO Design Options for LTE Advanced", 3GPP TSG RAN1#56, R1-090805, Athens, Greece, Feb. 9-13, 2009, 4 pages.
Motorola, "Uplink Transmission Schemes for Multi-Antenna UE", TSG-RAN WG1 #54bis R1-083829 Prague, Czech Republic, Sep. 29-Oct. 3, 2008, 5 pages.

* cited by examiner

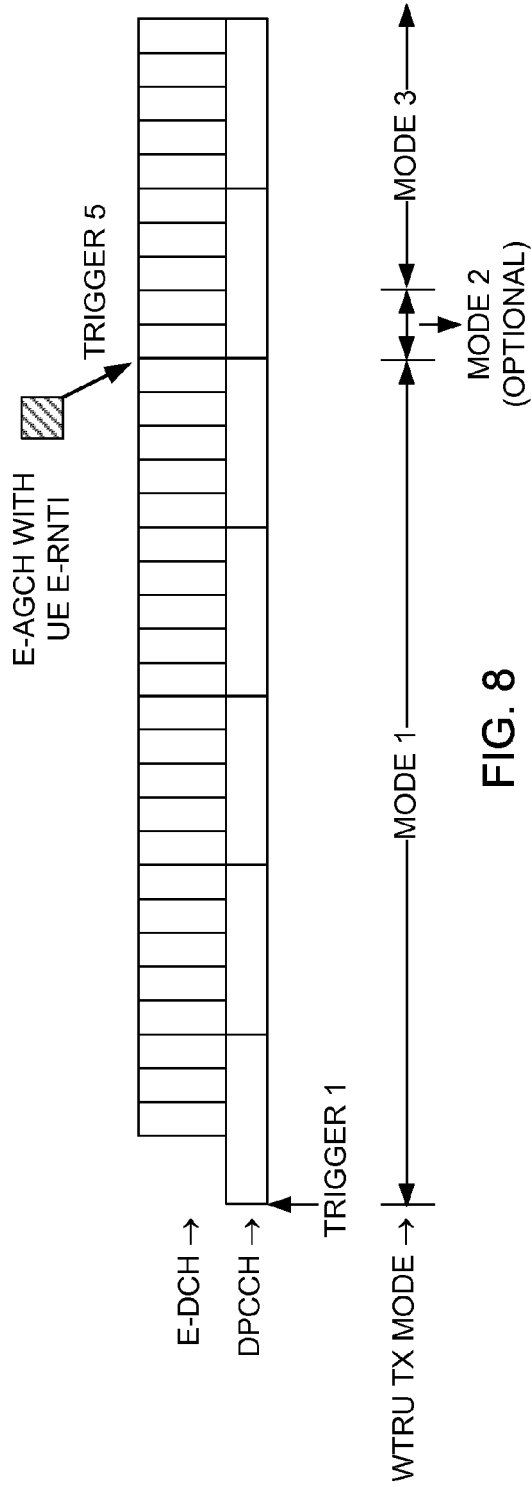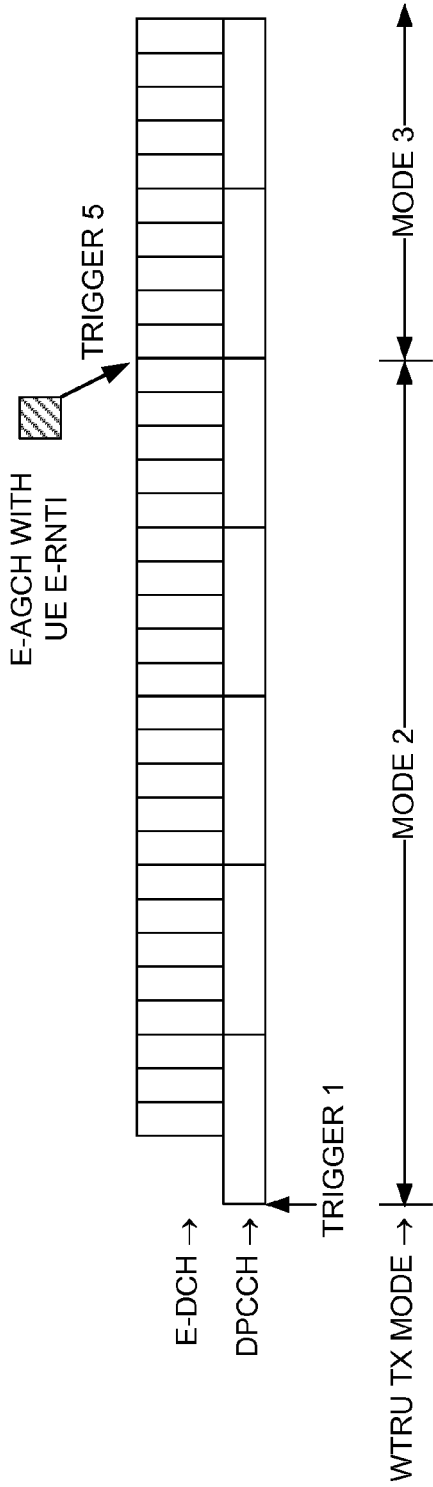

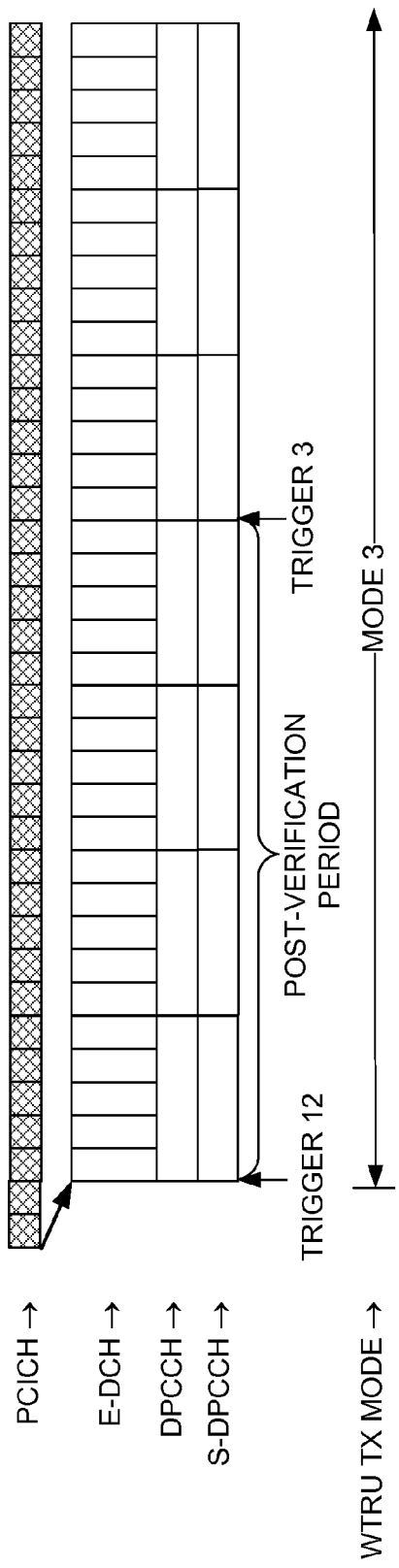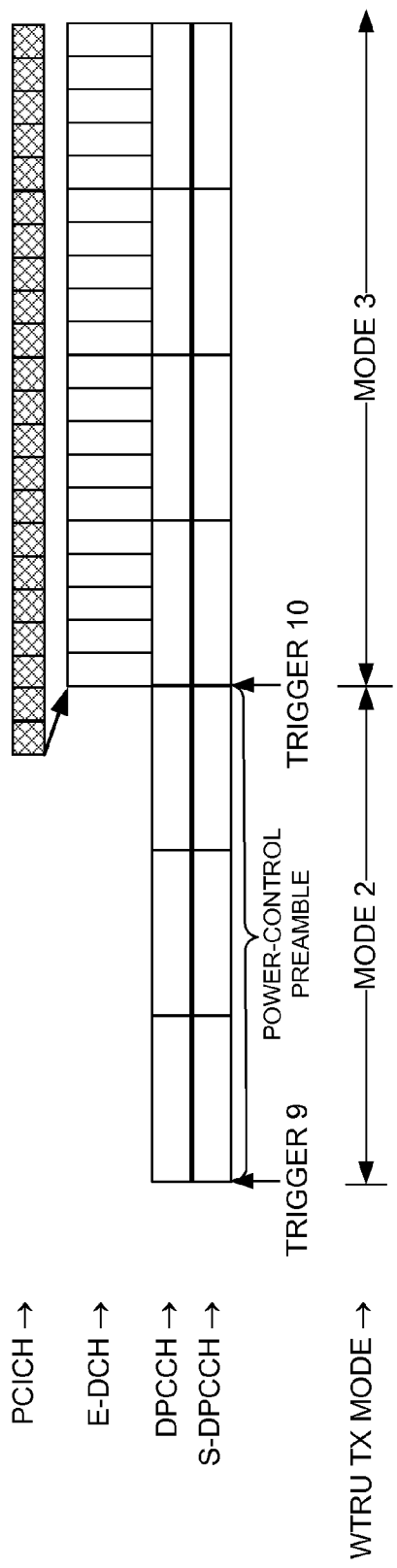

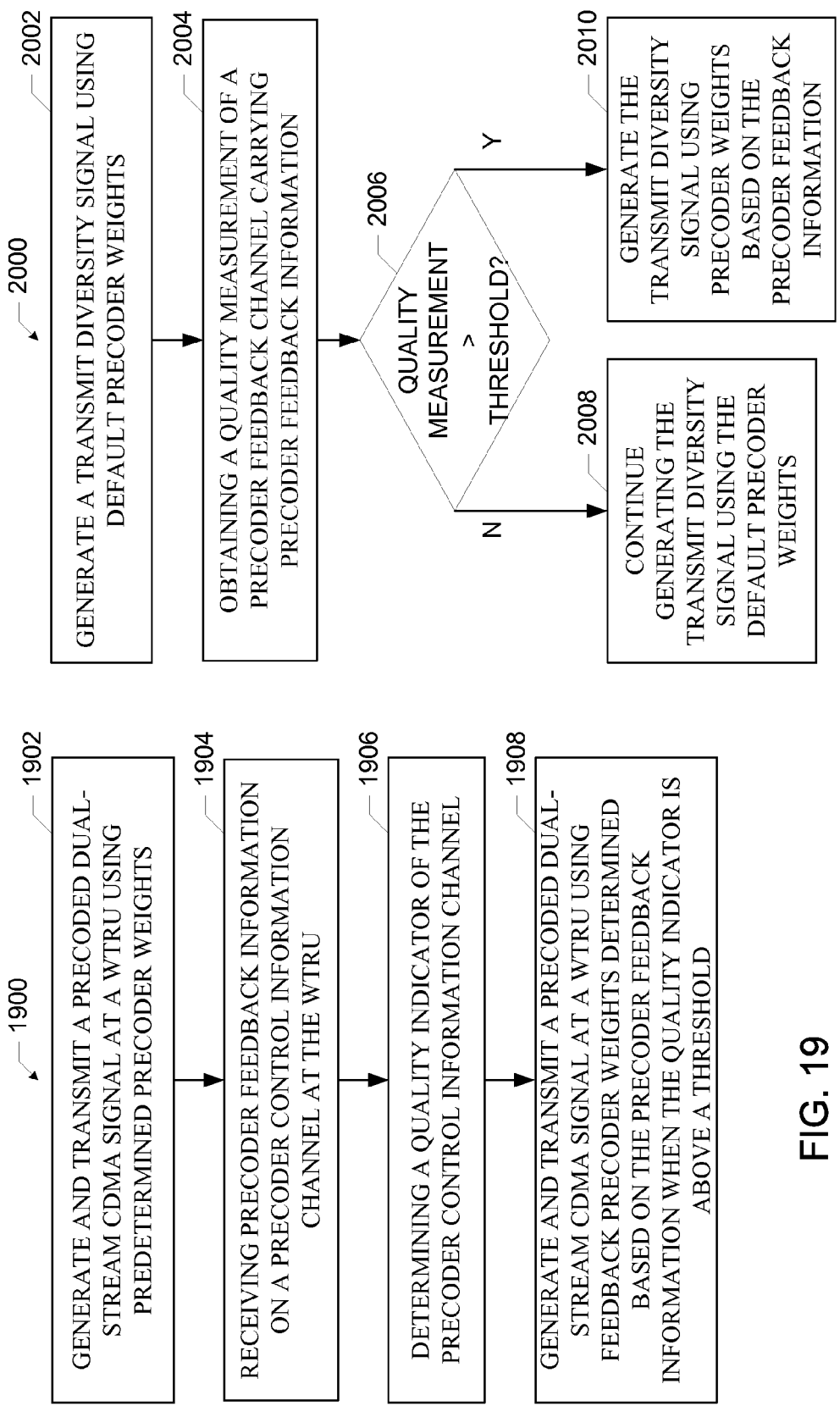

METHOD AND APPARATUS FOR CLOSED LOOP TRANSMIT DIVERSITY TRANSMISSION INITIAL ACCESS

CROSS REFERENCE TO RELATED APPLICATIONS

This application claims priority to U.S. Appln. No. 61/441,984, filed 11 Feb. 2011; U.S. Appln. No. 61/481,075, filed 29 Apr. 2011, and U.S. Appln. No. 61/523,065, filed 12 Aug. 2011, all of which are incorporated herein by reference.

BACKGROUND

The evolution of the universal mobile telecommunication system (UMTS) wideband code division multiple access (WCDMA) standards on the uplink has lagged in the past with respect to downlink transmission. The required data transmission on the downlink is usually assumed to be larger for users than the transmission in the uplink direction. It is expected that the uplink will also evolve and introduce multiple input multiple output (MIMO) technologies to reduce the peak data rate imbalance between the two link directions. Moreover, it is desirable to continue offering better service for wireless transmit/receive units (WTRUs) at the cell edge.

In order to support a higher data rate via stream multiplexing MIMO, or to support extended coverage via transmit diversity techniques, the uplink of WCDMA may be enhanced with transmit diversity techniques. Potential evolution from single transmit antenna to dual transmit antenna in the UMTS uplink may require the design of a control channel for carrying the pilot and other control information on the second or the newly added transmit antenna.

SUMMARY

Methods and apparatus are disclosed for using uplinks in closed loop transmit diversity (CLTD) while operating in a cell forward access channel (CELL_FACH) state and in idle mode, as well as for synchronization procedures with uplink CLTD and feedback quality monitoring. The operations are related to one or more radio resource control (RRC) states, such as a Cell_FACH state, Idle mode, cell paging channel (CELL_PCH) state, UTRAN registration area paging channel (URA_PCH) state and a cell dedicated channel (CELL_DCH) state.

The methods and apparatus disclosed include operations during the initial states and operations for resource access, such as radio link synchronization, radio link monitoring aspects, operations of a downlink feedback signal and uplink pilots during the synchronization stage.

The methods and apparatus disclosed include procedures for the WTRU when the pre-coding control information (PCI) carried in a downlink feedback signal is no longer reliable.

BRIEF DESCRIPTION OF THE DRAWINGS

A more detailed understanding may be had from the following description, given by way of example in conjunction with the accompanying drawings wherein:

FIG. 8 shows an example method for transmission mode changes upon collision resolution;

FIG. 9 shows another example method of transmission mode changes upon collision resolution;

FIG. 13 shows another example method of transmission mode change when a post-verification period is configured, where the WTRU operates in Mode 3;

FIG. 14 shows an example method of transmission mode change following a power control preamble;

FIGS. 19 and 20 are flow charts of some example methods.

DETAILED DESCRIPTION

Figure 1A:
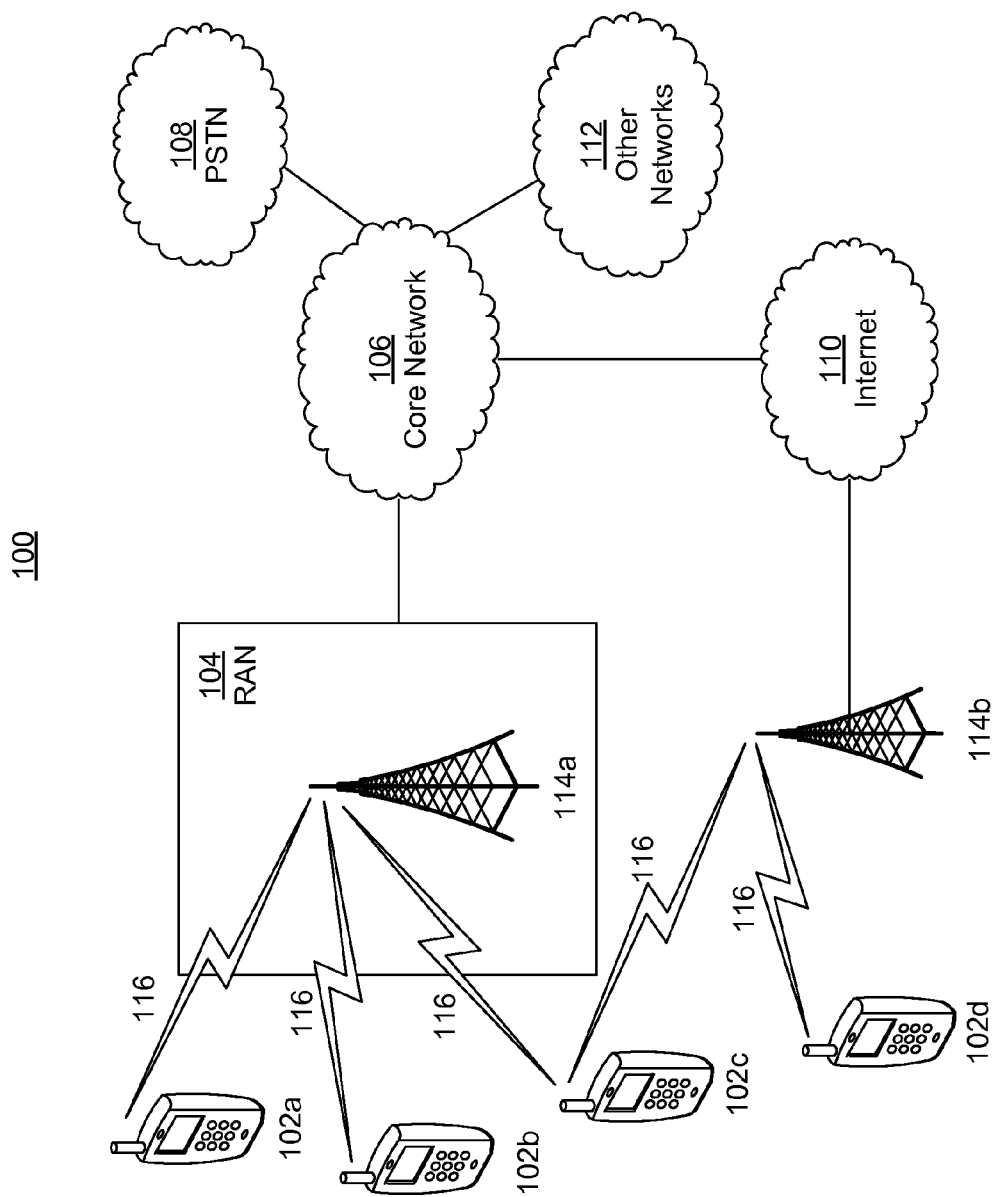
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode-B, a Home Node-B, a Home eNode-B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
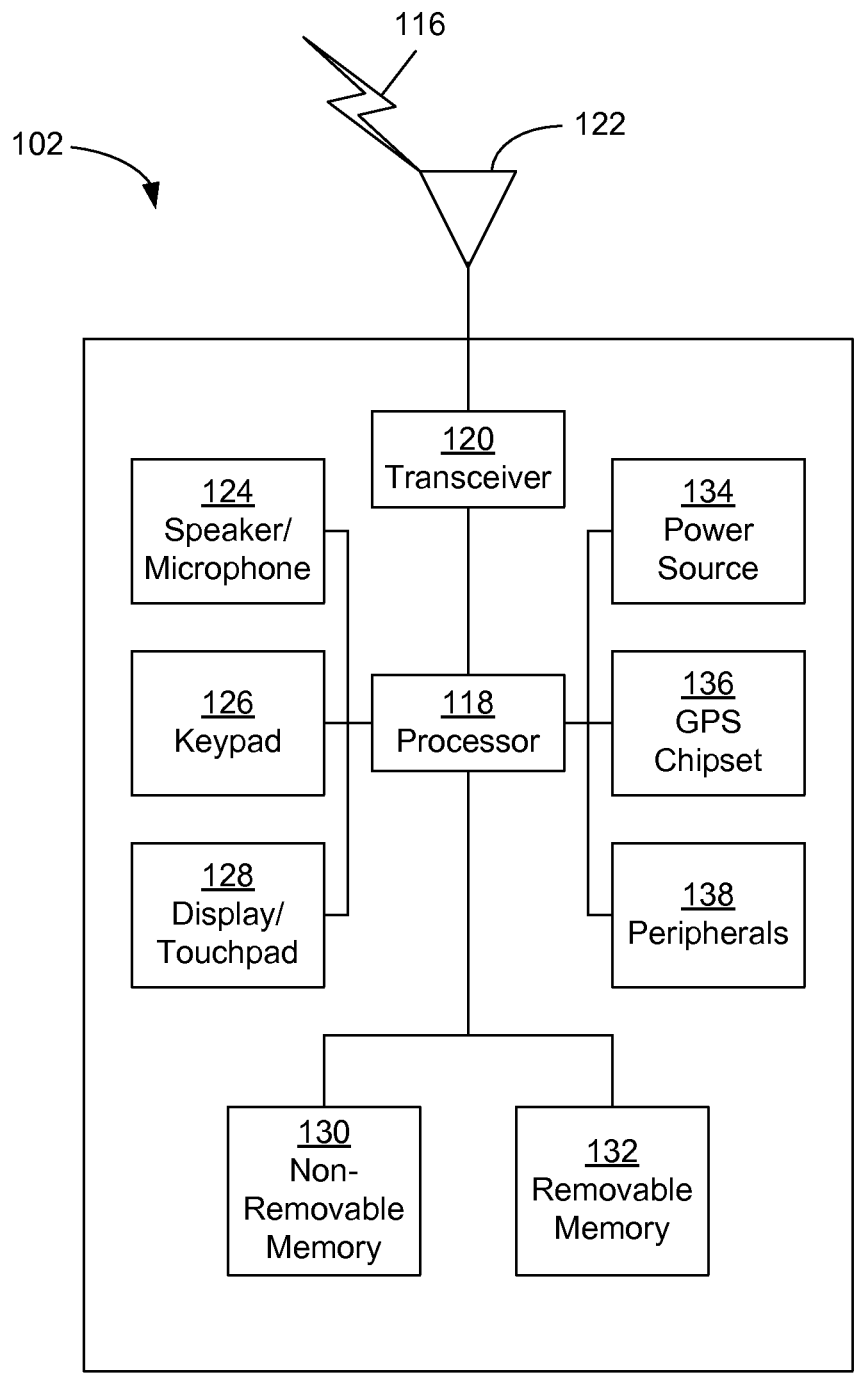
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, one or more transmit/receive elements 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
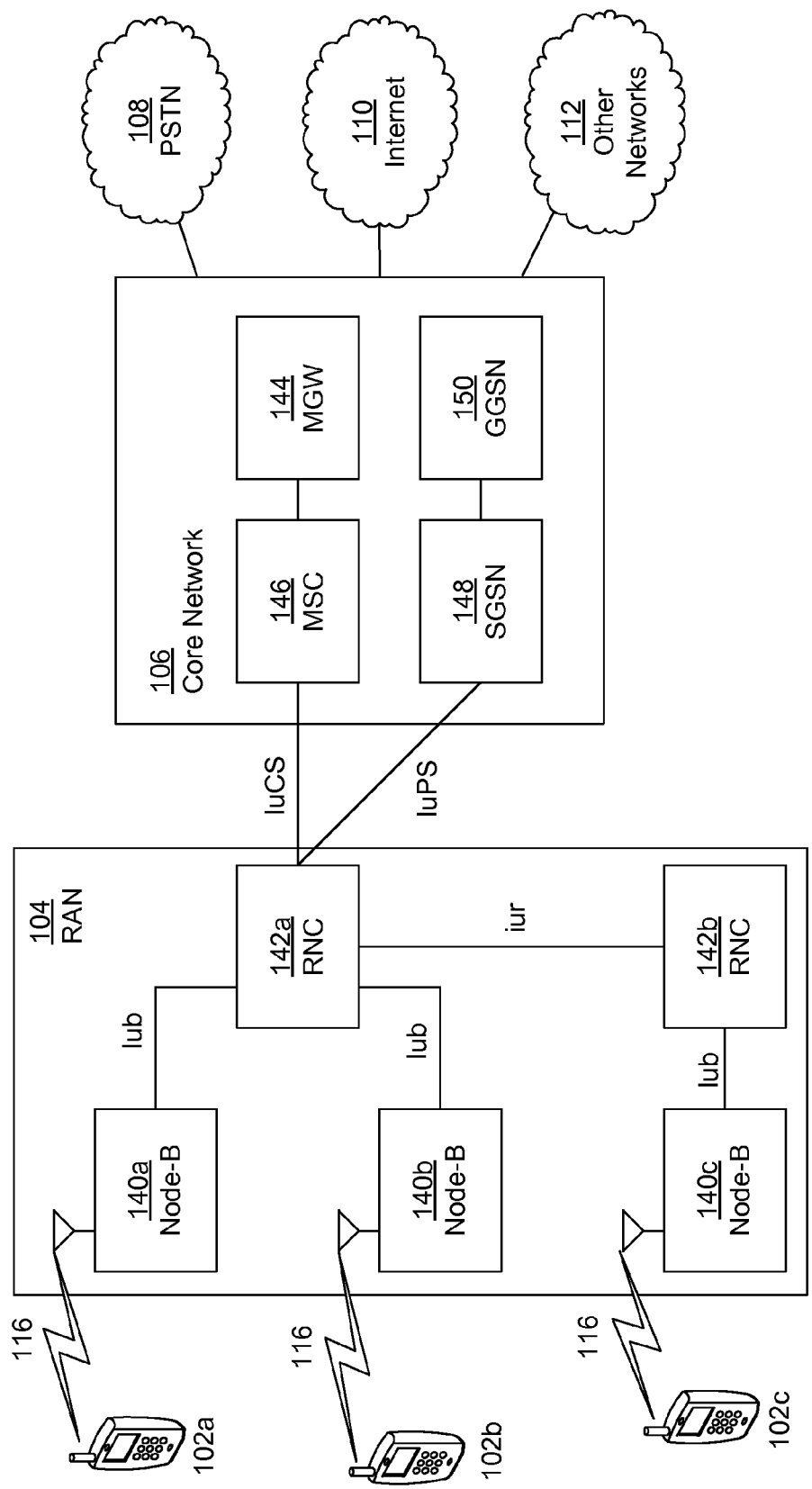
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 2:
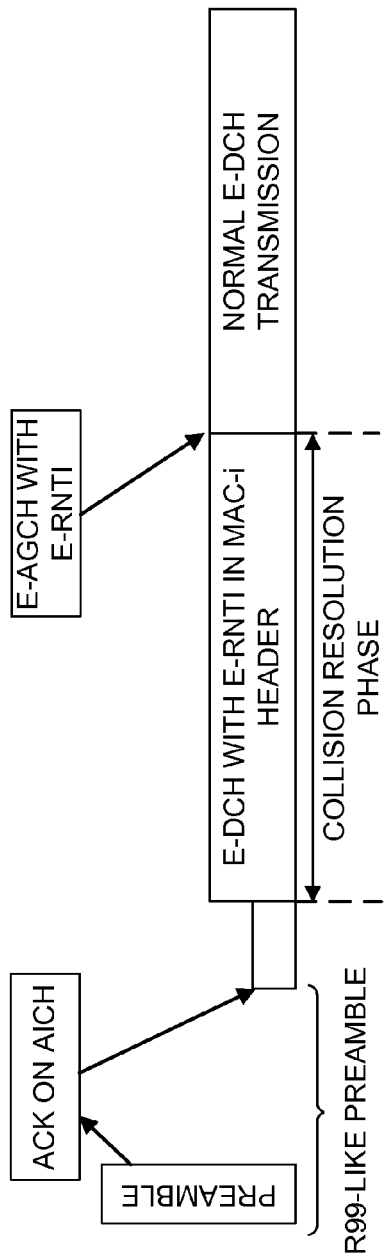
FIG. 2 shows an example of an enhanced dedicated channel (E-DCH) in a cell forward access channel state (CELL_FACH)

FIG. 2 shows a high level access procedure for enhanced dedicated channel (E-DCH) transmission in cell forward access channel (CELL_FACH). In a typical cellular wireless system, idle wireless transmit/receive units (WTRUs) may request access to system resources using a random access procedure. In UMTS, the random access channel (RACH) may be used for that purpose. The RACH is a part of the wireless protocol and the RACH may be improved to also support E-DCH transmission. At a high-level, the E-DCH feature in cell forward access channel (CELL_FACH) mode and idle mode consists of using the E-DCH after access to the resource is granted by the Node-B, via a power ramp-up procedure similar to the legacy procedure.

During closed-loop transmit diversity operations, the Node-B may indicate, via fast level one (L1) signaling, a set of spatial pre-coded weights the WTRU may use for transmission. By optimizing the choice of pre-coded weights, the WTRU may require less transmission power for the received signal-to-noise ratio (SNR) at the Node-B. This approach may improve coverage and reduce inter-cell interference. This may benefit E-DCH in the CELL_FACH state and in idle mode, where soft handover is not allowed. It may also be used in CELL_DCH mode.

The WTRU may determine uplink transmit diversity mode in CELL_FACH state, CELL_DCH and idle mode.

In an embodiment, a WTRU may determine to use uplink transmit diversity based on RRC configuration or reconfiguration messages when entering CELL_DCH state. In an alternative embodiment, a WTRU may determine whether or not to use uplink transmit diversity based on network configuration of physical RACH resource partitioning. The WTRU supporting uplink (UL) CLTD in CELL_FACH and idle mode may determine whether or not the feature is supported and whether or not to use the feature. If the feature is supported and is to be used, the WTRU may receive configuration and the physical resource partitioning. The WTRU may access the RACH using the configured subset of physical resources known to both the WTRU and Node-B.

In an embodiment, the WTRU may determine whether or not to use UL CLTD in CELL_FACH, CELL_DCH, and idle mode. To control the support of UL CLTD, the WTRU may be explicitly configured by the network to use UL CLTD (e.g., in CELL_FACH and CELL_DCH state). This may be achieved via radio resource controller (RRC) configuration. In some embodiments, the WTRU may first indicate in its RRC message that it supports UL CLTD transmission in CELL_FACH state. The network may respond by configuring the WTRU for using or not using the feature in the current cell. This may include, but is not limited to, CELL UPDATE CONFIRM RRC connection setup, radio bearer setup or a RRC reconfiguration message.

In another embodiment, the network may broadcast its capability in the system information and the WTRU may determine whether to use it or not in combination with any of the embodiments described herein. Alternatively, the network signals a set of UL CLTD specific resources. Based on the presence of this information element (IE), the WTRU may implicitly determine that the cell supports UL CLTD. The WTRU may determine whether or not to use UL CLTD in the CELL_FACH state and idle mode based on the support of the feature as broadcast by the cell. More specifically, the WTRU may read the system information block (SIB) to determine if the cell supports UL CLTD in CELL_FACH or idle mode. If the cell supports it and the WTRU supports it, the WTRU may use the feature for uplink transmission.

In addition to the configuration by the network, the WTRU may optionally use one or a combination of criteria to determine whether it can use UL CLTD in CELL_FACH state. The WTRU may have a dedicated E-DCH radio network temporary identifier (E-RNTI) configured. Optionally, in addition to the E-RNTI the WTRU may also have a high speed downlink shared channel (HS-DSCH) radio network transaction identifier (H-RNTI) and/or a cell radio network temporary identifier (C-RNTI) configured. More specifically, if the WTRU, according to the RRC signaling, determines that the WTRU, the cell and the network support UL CLTD and the WTRU has an E-RNTI configured, it may use UL CLTD in CELL_FACH. As an example, upon a cell reselection or radio link failure, the WTRU does not use UL CLTD in transmitting the CELL UPDATE to the network.

The WTRU may perform DTCH or DCCH transmission. In some embodiments, the WTRU may not use UL CLTD for common control channel (CCCH) transmission, but may use UL CLTD in CELL_FACH state for dedicated traffic channel (DTCH) and dedicated control channel (DCCH) transmission when it determines that the WTRU, cell and the network support the feature.

For performing random access channel (RACH) operation, the WTRU may be configured with a number of parameters for performing the power ramp-up procedure in order to get an acknowledgement (ACK) and permission for transmission on the UL. The WTRU may be aware of a set of physical resources that it may use for transmission. These physical resources may include a preamble scrambling code or a set of available signatures and a set of available RACH sub-channels corresponding to E-DCH resources for each Access Service Class (ASC).

In an embodiment, the network may transmit the physical resource for UL CLTD RACH transmission on the SIBs separately from the physical resources configured for common E-DCH transmission. If the WTRU is configured to use UL CLTD, the WTRU may use the physical resources for UL CLTD RACH as transmitted in the separate set of IEs to initiate the random access procedure. As an example, this may be achieved by introducing a new IE, a physical random access channel (PRACH) preamble control parameter with enhanced UL CLTD ("PRACH preamble control parameters enhanced Uplink with UL CLTD") that contains the PRACH parameters to use for UL CLTD WTRUs. This IE may be included as part of the IE common E-DCH system information, or directly in the SIB5/5bis. When the WTRU determines that it may use UL CTLD, it may use this IE to determine the RACH parameters (e.g., the new IE "PRACH preamble control parameters enhanced Uplink with UL CLTD"). Alternatively, the WTRU may use the same PRACH preamble control parameters regardless of the support of UL CLTD.

In another embodiment, the network may separate the set of common E-DCH parameters in which UL CLTD may be configured. This may be performed by transmitting an entire separate set of IEs for WTRUs to use the common E-DCH within UL CLTD operations. As an example, a new IE "Common E-DCH Resource Configuration information list for UL CLTD" may be signaled. The new set of UL CLTD parameters may include a separate set of preamble signatures and common E-DCH resources. If according to the criteria described above, the WTRU determines that it will be using UL CLTD, it may choose a preamble signature from the UL CLTD specific list. If a positive acknowledgment is received on the AICH, or if a resource index is received on the E-AI, the WTRU may determine the E-DCH resource to use from the set of UL CLTD common E-DCH resources (e.g., from IE "Common E-DCH Resource Configuration information list for UL CLTD").

Alternatively, the preamble signatures used for the preamble ramp-up phase may be a common set of preambles that can be used by all UL CLTD and non-UL CLTD WTRUs, but a separate set of Common E-DCH resources of UL CLTD may be provided to the WTRU. Alternatively, within the "Common E-DCH resource information list," an explicit information element may be added for each resource that indicates whether the WTRU may use UL CLTD with this resource. Alternatively, if the resources have the UL CLTD specific configuration (e.g., precoder control indicator channel or PCICH information or secondary DPCCH information) present, the WTRU may implicitly determine that it may use UL CLTD with this resource.

If, upon reception of the acquisition indicator channel (AICH) or extended acquisition indicator (E-AI), the resource index provided to the WTRU corresponds to a resource that is explicitly or implicitly indicating the support of UL CLTD, the WTRU determines that it can start using UL CLTD according to any of the embodiments described herein. Alternatively, a separate IE may be added that indicates explicitly the index number out of the common E-DCH resource list that may use UL CLTD.

In addition to the common E-DCH resources, additional information may be provided to the WTRU via the broadcast channel. The additional information may include but is not limited to: precoding control indicator channel (PCICH) information (which may include a channelization code and a slot format), a secondary DPCCH, which may include a power offset, format, and an initial pre-coding weight restriction. This information may be signaled as part of the common E-DCH resource list. More specifically, for every resource in which UL CLTD may be used, this or a subset of this information is signaled. Alternatively, some of these parameters may be provided per resource and some may be provided as common parameters in the "Common E-DCH info", for instance.

In an alternative embodiment, for some of these parameters, such as the PCICH information, a pre-defined rule may be defined that allows the WTRU to determine the slot and code with respect to the fractional dedicated physical channel (F-DPCH). In one solution the PCICH may be adjacent to the F-DPCH field in the same radio slot and may use the same channelization code.

In another embodiment, the WTRU may explicitly indicate to the network that it supports UL CLTD in CELL_FACH state and idle mode. This capability may be reported to the network by the WTRU in the RRC connection request or in the RRC Connection Setup Complete. To further allow the cell to determine whether the WTRU supports UL CLTD as it performs cell reselection, the WTRU may further report the capability with a cell update message. Upon every cell reselection, the WTRU may transmit this capability to the network. This may always be performed, or may only be performed upon determining that the network supports the capability.

In another embodiment one common capability may be that the WTRU includes both CELL_FACH and CELL_DCH. More specifically, if the WTRU supports UL CLTD, it may support all states. This may be reported to the network in a manner similar to the UL CLTD in CELL_FACH approach.

In another embodiment, the network may implicitly determine that the WTRU supports UL CLTD in CELL_FACH and/or CELL_DCH based on the PRACH resources that it used to perform UL access. This may allow the WTRU to not include the capability in every CELL Update.

The WTRU may report this capability in a medium access control packet data unit (MAC PDU), using a special header field in the MAC-i header to indicate the presence, or optionally, as part of collision resolution. These embodiments may be used individually or in any combination. For example, the UL CLTD capability may be reported as part of the RRC establishment procedure, and further implicitly determined by the network (e.g., while operating in CELL_FACH state), based on the resources used by the WTRU.

In another embodiment, the WTRU may receive an explicit message from the Node-B to indicate operation in UL CLTD mode. In an embodiment, when the WTRU and the cell support UL CLTD operations in CELL_FACH, the WTRU initiates UL CLTD operations after receiving the E-DCH absolute grant channel (E-AGCH) with its E-RNTI, after the collision resolution phase is completed successfully. This approach allows the radio link to be synchronized before sending weight indications to the WTRU. This approach may also prevent creating excessive interference when a collision occurs and more than one WTRU has started transmission.

In another embodiment, the WTRU receives an explicit indication to start using UL CLTD mode after collision resolution has completed successfully. In one embodiment, this indication may be carried, for example, using the E-AGCH upon collision resolution.

In another embodiment, the WTRU may be configured with two (2) E-RNTIs. One E-RNTI may be used by the network in collision resolution to indicate that the WTRU may use UL CLTD operations. The other E-RNTI indicates regular, no transmit diversity, operations.

In another embodiment, a special value, or a set of values, of an absolute grant in the E-AGCH is reserved to indicate that the WTRU may use UL CLTD operations. Upon reception of this grant value on the E-AGCH for the contention resolution, the WTRU may keep using the default grant and initiate UL CLTD operations.

In another embodiment, the Node-B may explicitly configure the WTRU to start using UL CLTD via a high speed shared control channel (HS-SCCH) order. A new order to activate/deactivate UL CLTD may be provided. This order may be specific to the CELL_FACH state or may be an order that is defined and may be used in all states. The order may be used after collision resolution is completed and the network is aware of the WTRU identity that is using the resource, it may able to explicitly start/stop the UL CLTD operation.

In another embodiment, the network may explicitly configure the WTRU using a MAC PDU, by adding a MAC control element in the downlink and indicating the presence of this control element via a special MAC-ehs header.

The WTRU may apply transmit diversity as will now be discussed.

In an embodiment, an initial weight selection is defined. The WTRU may be configured by the network to use a specific pre-coded weight during the initialization period. This weight may be configured as a common value for all common E-DCH resources. Each E-DCH resource may be configured with a specific weight value. Alternatively, the pre-coded weight may be signaled in the HS-SCCH order or in the MAC PDU used to initiate UL CLTD.

In another embodiment, the initial weight may be fixed by specifications (i.e., predetermined). The weight may be a special pre-coded weight, for instance the weight vector value [1 0] or [0 1] which may correspond to transmitting all the data and control information on a single antenna and at least one control channel carrying pilot may be transmitted on each antenna for channel estimation purposes. The predetermined weights may be a predetermined precoder codebook entry.

Figure 3:
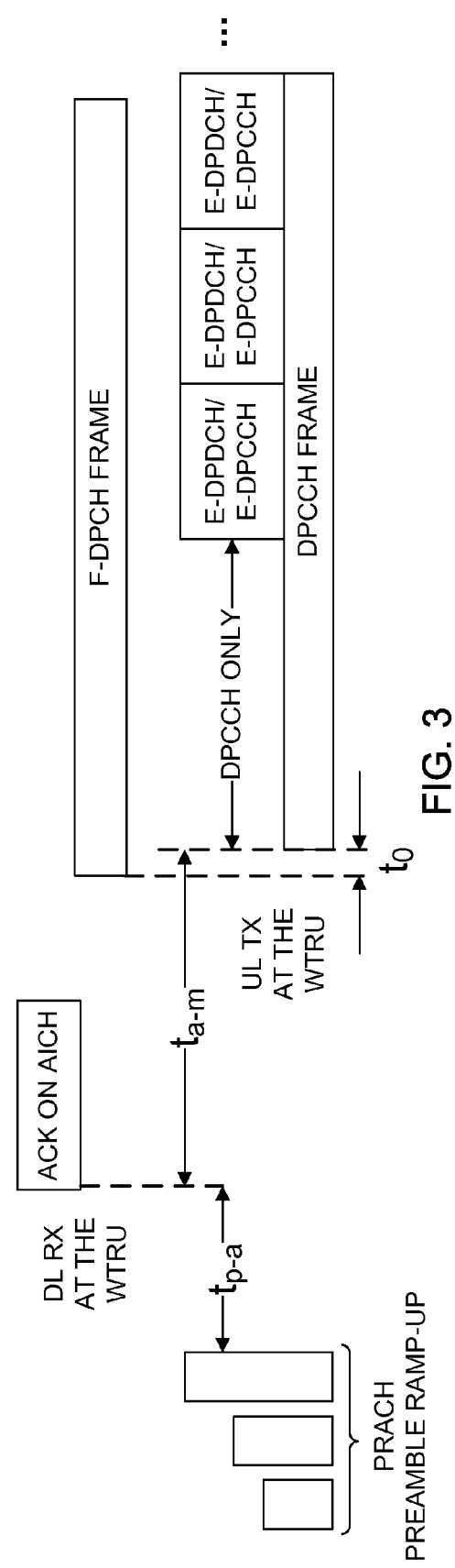
FIG. 3 shows an example of E-DCH in CELL_FACH start of transmission timing.

FIG. 3 shows a transmission time interval (TTI) for a closed loop operation, including a PRACH preamble ramp-up. In common E-DCH operations, the WTRU may start uplink transmission at a fixed time offset after receiving the ACK on the AICH. The WTRU may transmit uplink DPCCH during a configurable number of TTIs (i.e., a minimum 2 TTIs for 2 ms TTI plus an additional E-DCH transmission back-off configured by the network) and may then transmits E-DCH.

The PRACH preamble ramp-up is designed to allow the WTRU to reach the required power to establish initial radio connection with the Node-B. When the Node-B detects a preamble, it may respond with an ACK on AICH indicating that further transmission is permitted A DPCCH-only or E-DCH transmission back off period may be used for stabilizing a power control loop in both UL and DL communications. Post-verification may be used for common E-DCH. In addition, there may be several transmission modes.

In a transmission mode, Mode 1, the WTRU may not apply any transmit diversity and may not transmit any information on its second antenna. For convenience, this mode may be referred to as "no transmit diversity" or "No-TD mode". It is possible that some WTRUs implement transmit information on more than one antenna even in this mode. However, it is assumed that the Node-B and network are unaware of it. This mode may be used as a "default" transmission mode before the WTRU changes to a transmit diversity mode.

In a transmission mode, labeled Mode 2, may be used as a default mode, such as when entering CELL_DCH mode, where the WTRU may apply transmit diversity by pre-coding, with a first pre-coding weight, one or more of the DPCCH, the E-DCH and high-speed dedicated physical control (HS-DPCCH) channels. The WTRU may also transmit the secondary pilot control channel (or S-DPCCH) on the second pre-coded weight. In this transmission mode, the WTRU may monitor the downlink pre-coding control information (PCI) but does not apply the weights that are signaled. For convenience, this mode will be referred to as "open-loop transmit diversity" or "OLTD" mode. In this transmission mode, the WTRU may also be operating in open loop transmit diversity and adjusts its weights based on implicit feedback from the Node-B (e.g., based on TPC commands, ACK/NACK, etc.). Alternatively in this transmission mode, the WTRU may be operating with space-time transmit diversity (STTD) for example.

In a transmission mode, Mode 3, the WTRU operates in full closed loop transmit diversity mode. The WTRU applies transmit diversity by pre-coding with a first pre-coding weight the DPCCH and optionally, the E-DCH and HS-DPCCH channels. The WTRU may also transmit the secondary pilot control channel (or S-DPCCH) on the second pre-coded weight. In this transmission mode, the WTRU monitors the downlink PCI and applies the weights that are signaled just as in a regular closed loop operation in CELL_DCH. For convenience, this mode will be referred to as "closed-loop transmit diversity" or "CLTD" mode. Also in this mode, for a short period of time at the initialization, the WTRU may use a pre-defined precoding vector until it receives the first PCI from the Node-B. The Node-B may start transmitting the PCI information before it receives the DPCCH and S-DPCCH (i.e., with incomplete channel estimate). In such case, the Node-B may indicate a precoding weight that does not depend on channel estimates (with some performance degradation).

In addition, a number of event triggers may be used. Using an event trigger, Trigger 1, the WTRU starts transmitting the UL DPCCH after receiving the ACK on AICH ($t_{a-m}$ after the beginning of the AICH slot carrying the ACK). Using an event trigger, Trigger 2, the WTRU starts transmitting E-DCH on the uplink after the E-DCH transmission backoff period has elapsed. Using an event trigger, Trigger 3, post-verification may have succeeded. This occurs 40 ms after the WTRU has started uplink transmission. Using an event trigger, Trigger 4, the WTRU has monitored the quality of the PCI channel and has declared it to be sufficiently reliable. Using an event trigger, Trigger 5, the WTRU has received the E-AGCH with its E-RNTI and the collision resolution is successful. Using an event trigger, Trigger 6, the WTRU receives a special indication by the network to initiates transmit diversity operations (e.g., high-speed shared control channel (HS-SCCH) order for activation of UL CLTD). Upon an event trigger, Trigger 7, the WTRU may start transmitting PRACH preambles during the RACH power ramp-up procedure. Another trigger, Trigger 8, indicates that a certain amount of time (e.g., expressed in number of slots, subframes or frames) has elapsed since the WTRU has started transmission or another known time reference. In one example, such trigger could be linked to the second phase of the synchronization procedure (i.e. 160 ms after the downlink physical channel is considered established). In another example, this trigger could be linked to the starting time of the uplink E-DCH transmission.

Figure 4:
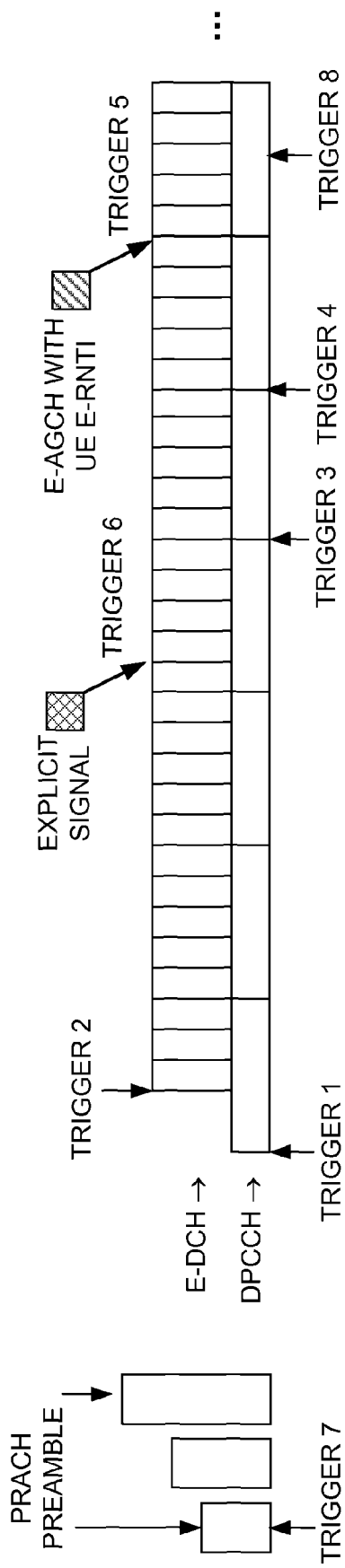
FIG. 4 shows an example of an event trigger timeline for common E-DCH operations.

FIG. 4 illustrates an example timeline with an indication as to where the triggers may occur. The order of the triggers shown in FIG. 4 is for demonstrative purpose only. It should be understood, that even though Trigger 6 is shown before Trigger 5 in FIG. 4, it may also occur after Trigger 5. Also, for convenience, only the channels PRACH, DPCCH and E-DCH are shown, but other channels may be similarly controlled according to transmission modes described herein.

In a most general form of this method, the WTRU may be configured to use transmission diversity in increasing mode order (starting from Mode 1 up to Mode 3), changing mode based on pre-configured event triggers. WTRU may be configured to start a transmission mode larger than Mode 1, and triggers may be used in any order or combination. In one embodiment, the WTRU may begin in Mode 2 when in CELL_DCH mode, and move to Mode 3 using a trigger, such as trigger 4, based on the quality of the quality of the PCI channel. In further embodiments, the WTRU may be configured to apply a change of transmission mode a fixed period of time after an event trigger.

Figure 5:
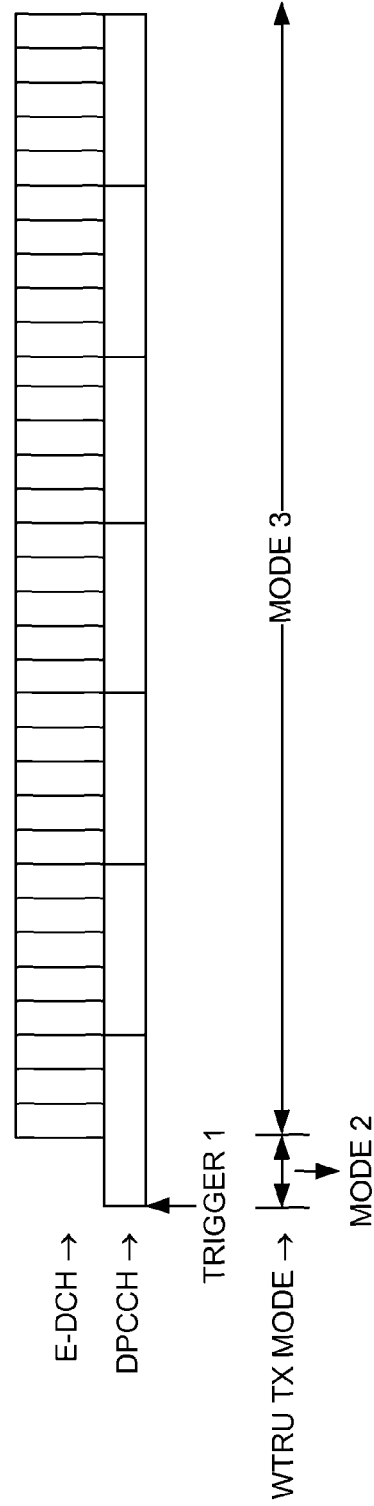
FIG. 5 shows an example of transmit diversity operation mode.

FIG. 5 shows an embodiment where the WTRU may be configured to use transmission diversity Mode 2 open-loop transmit diversity (OLTD) upon starting the UL transmission using Trigger 1. In an embodiment, the pre-configured pre-coded weight consists of the [1 0] weight for the main, or primary beam, carrying the DPCCH, E-DCH and optionally the HS-DPCCH, and [0 1] for the secondary beam carrying the S-DPCCH. The WTRU may then move to the transmission diversity Mode 3 CLTD a fixed time after transmission has started. This fixed time period may be long enough to allow the network to perform reliable channel estimation and transmit the PCI on the downlink. For example, the WTRU may be configured to start CLTD operations, and apply weights as signaled on the PCI, five slots after the beginning of the UL OLTD transmission (e.g., three slots for UL channel estimation and two more slots for PCI delay transmission).

Figure 6:
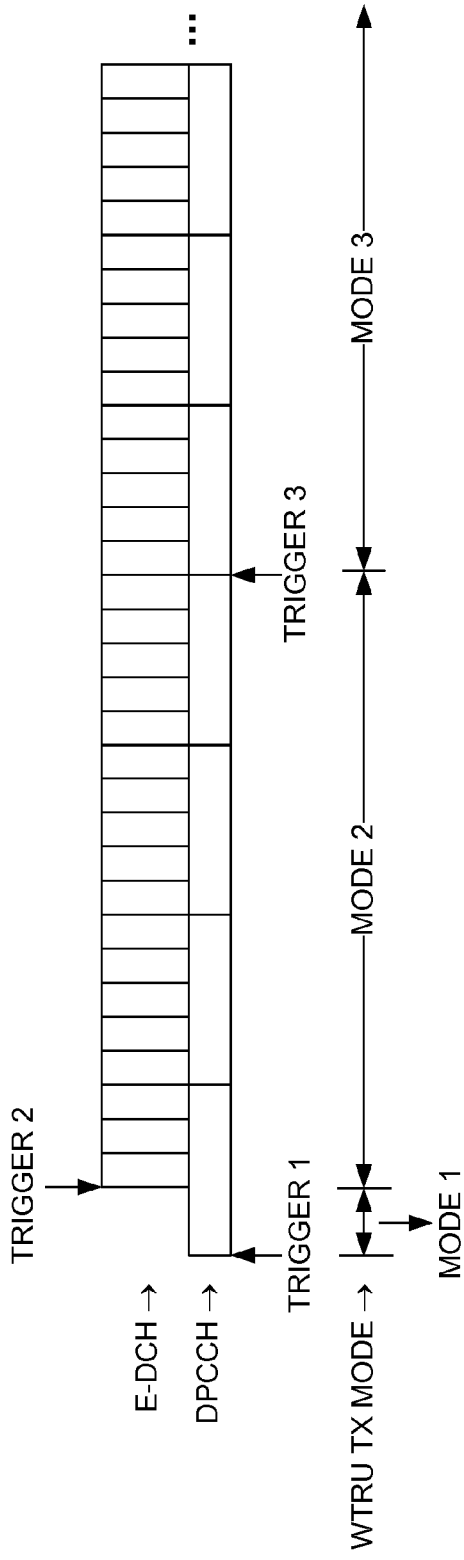
FIG. 6 shows an example method for transmission mode changes using a trigger.

In an embodiment for closed loop operation with common E-DCH, the WTRU starts uplink transmission using a No-TD mode during the DPCCH only phase. At the end of the E-DCH transmission back-off using Trigger 2, the WTRU starts using OLTD mode with a pre-configured pre-coded weight. In an embodiment, the pre-configured pre-coded weight consists of the [1 0] weight for the main, or primary beam, carrying the DPCCH, E-DCH and optionally, the HS-DPCCH, and [0 1] for the secondary beam carrying the S-DPCCH. Optionally, to account for PCI estimation and transmission delays, the WTRU applies the signal weights a fixed period of time after Trigger 2, which is a fixed period of time (e.g., 2 slots) after the E-DCH transmission backoff period is completed. The WTRU may then move to transmission Mode 3 upon another event trigger. For example, after the post-verification period is considered successful it may use Trigger 3, when the WTRU determines that the PCI reception quality is good enough it may use Trigger 4, after successful collision resolution it may use Trigger 6, or after reception of an explicit signal by the Node-B to initial CLTD it may use Trigger 7. FIG. 6 shows an example case where Trigger 3 is used to move to transmission Mode 3.

Figure 7:
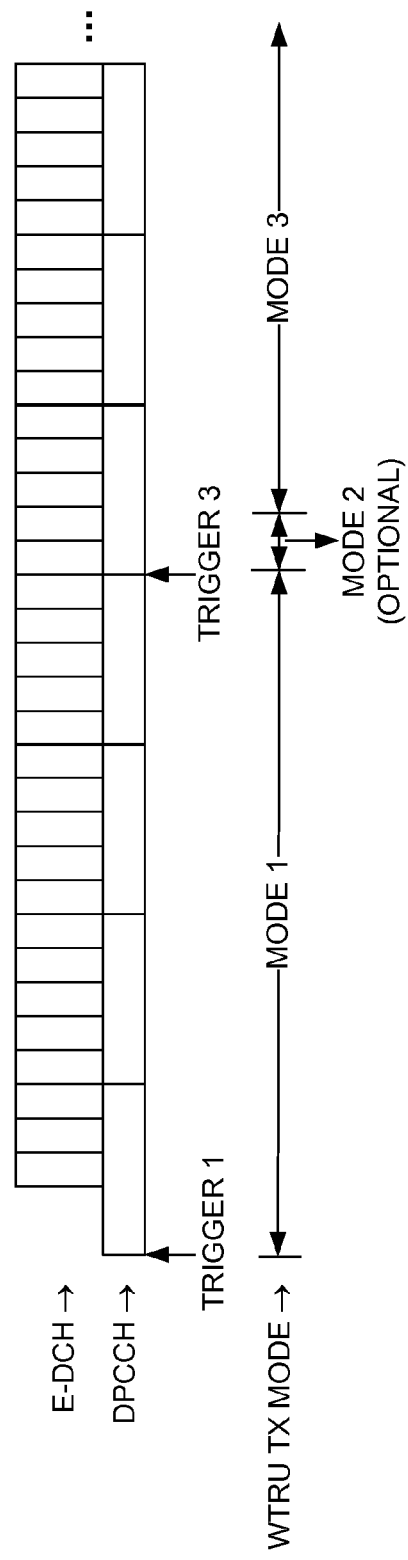
FIG. 7 shows an example method for transmission mode changes when reliable control channel reception is declared.

In another embodiment for closed loop operations with common E-DCH, the WTRU may use transmission Mode 1 until reliable reception of the downlink control channels is confirmed and then may move to transmission Mode 2, for a short transition, and Mode 3. For example, the WTRU may transmit using Mode 1 until post-verification is successful using Trigger 3, and then start transmitting using transmit diversity. The WTRU may use Mode 2 transmission operations for a fixed period of time after which the WTRU may initiate Mode 3 transmission operations. This period of time after Trigger 3 is used may allow for proper channel estimation at the Node-B and the processing/transmission delay for the PCI indication. This embodiment is illustrated in FIG. 7. This embodiment may also be used during synchronization in CELL_DCH.

In an alternative embodiment, the WTRU may also use the collision resolution trigger, Trigger 5, to change the transmission mode. This embodiment is illustrated in FIGS. 8 and 9.

The WTRU may further be configured to change the transmission following Trigger combinations. In one embodiment, the WTRU is configured to change the transmission mode (e.g. from Mode 2 to Mode 3) after collision resolution (Trigger 5) and only if the WTRU has determined that the quality of the PCI channel is sufficiently reliable (Trigger 4).

Three different transmission modes have been defined above: Mode 1, Mode 2, and Mode 3. In transmission Mode 1, the WTRU does not apply transmit diversity, in Mode 2, the WTRU applies transmit diversity but does not change the weights based on the Node-B PCI signalling, and in Mode 3, the WTRU operates in normal UL CLTD operations, applying the weighs as signalled by the Node-B. various embodiments use only a subset of these modes, such as modes 1 and 3, modes 2 and 3, etc.

Upon changes of transmission mode, the WTRU may have to adjust its transmission power to ensure that the signal is received at the Node-B with the appropriate power, without causing too much undue interference in the other cells.

In one method to ensure that appropriate transmit power is used, the WTRU applies a power backoff when changing transmission mode. The WTRU may receive the power backoff configuration via RRC signalling or the amount of power backoff may be pre-configured in the specifications. The WTRU may be configured to apply a different power backoff for each possible transmission mode transition. As a special case, some transition may be configured with a power backoff of 0 dB (i.e. no backoff). An example power backoff transition table is shown in Table 1, where most of the entries are configured with a 0 dB backoff (i.e. no backoff).

TABLE 1

Example power backoff transition table

|  |  | Power backoff (in dB) Transition to: | | |
|---|---|---|---|---|
|  |  | Mode 1 | Mode 2 | Mode 3 |
| Transition from: | Mode 1 | 0 | −1 | −3 |
|  | Mode 2 | 0 | 0 | −2 |
|  | Mode 3 | 0 | 0 | 0 |

In one specific example of this method, a power backoff is applied only when the WTRU transitions to transmission Mode 3 (from Mode 1 or Mode 2). Furthermore, in this case, a single power backoff value may be configured, regardless of the origin transmission Mode.

The WTRU may apply the power backoff on the DPCCH directly such that all other physical channels are affected accordingly. For example, the initial uplink DPCCH transmit power after mode transition can be computed (in dB) as:

$$\text{Uplink DPCCH transmit power} = P_{DPCCH} + \text{Power backoff}$$

where $P_{DPCCH}$ is the uplink DPCCH transmit power of the last DPCCH slot before switching of the transmission mode.

The power backoff is applied once and it is assumed that the inner loop power control will further adjust the WTRU transmit power to the appropriate value.

Several embodiments for performing a synchronization procedure will now be described, which relate to the WTRU having UL CLTD capability, where a second DPCCH or S-DPCCH is also transmitted together with the first DPCCH, or simply DPCCH during the normal operation.

A number of event triggers are defined for this embodiment for transmission mode to going to CELL_DCH, including the following. Upon an event trigger, Trigger 9, the WTRU may start the transmission of the power control preamble (similar to Trigger 1 described above). In response to an event trigger, Trigger 10, the WTRU may end transmission of the power control preamble and starts transmission of the E-DCH (similar to Trigger 2 above) or DCH. An event trigger, Trigger 11, indicates that the WTRU has monitored the quality of the F-DPCH channel and the WTRU higher layers consider the downlink physical channel established. In response to a Trigger 12, the WTRU may start UL transmission in CELL_DCH when post-verification is configured, assuming the downlink physical channel is established (similar to Trigger 11). One or more of these trigger events may be used depending on the configuration.

The power control preamble consists of the WTRU transmitting only DPCCH for a configured number of frames before starting transmission of data or other control channels.

Depending on whether the WTRU is configured to use post verification and/or a power control preamble during synchronization procedures, several configuration scenarios and different uplink transmission schemes may be used, as described below. It should be understood that although different uplink transmission schemes and solutions are presented in the following under the context of each scenario, these solutions may also apply to the other scenarios. In the following, the E-DCH is used for convenience in the description of the operations. It should be understood that the methods are not limited to E-DCH operations, for instance the DCH may also be equivalently used or a combination of the E-DCH (2 ms TTI or 10 ms TTI) and the DCH.

In an embodiment, neither a post verification nor power control preamble may be configured. Power control preamble may be considered not configured when it is configured to value 0 (i.e., PC preamble is configured to 0 frames). The uplink transmission may begin after DL synchronization has been achieved, or more specifically when the higher layers consider the downlink channel established (Trigger 11). Therefore, the WTRU may operate in normal CLTD fashion (e.g., Mode 3). As the initial precoding vector (before the first PCI is received from the PCI channel (PCICH)), the WTRU may use a precoding vector signaled via a higher layer.

Figure 10:
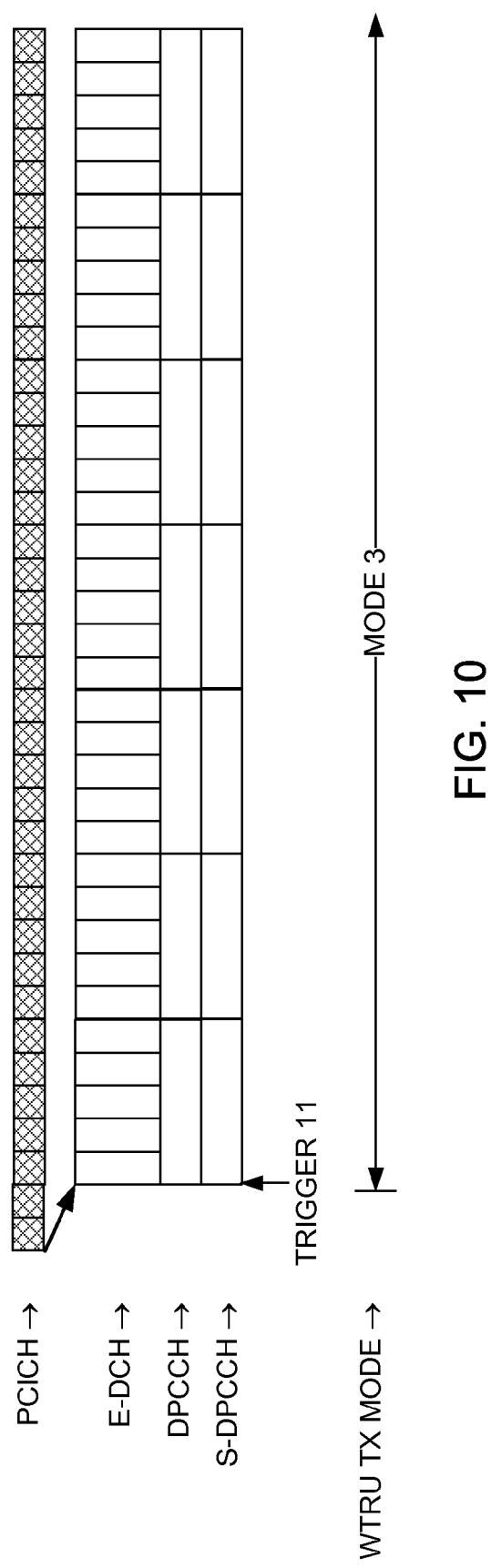
FIG. 10 shows an example method of transmission mode going to CELL_DCH state, where the WTRU operates in Mode 3.

FIG. 10 shows an example transmission mode going to CELL_DCH. As shown, the Node-B may signal a PCI on the PCICH before it has received pilot signals, thereby choosing arbitrary weights.

Figure 11A:
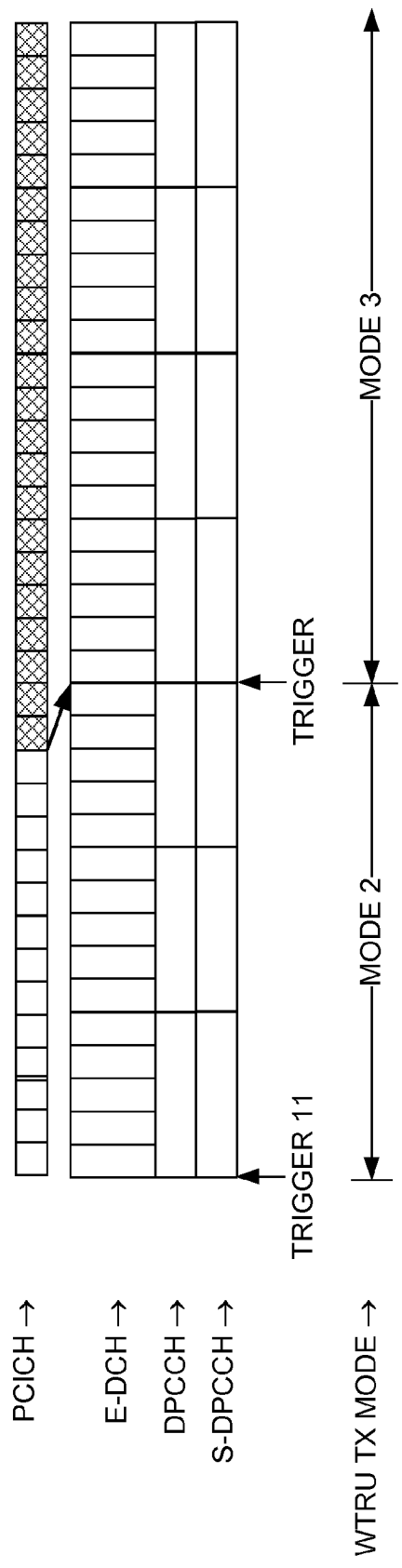
FIG. 11A shows another example method of transmission mode going to CELL_DCH state, where the WTRU operates in Mode 2 and Mode 3.

FIG. 11A shows another example transmission mode going to CELL_DCH related to the PCI. The WTRU may start transmission in Mode 2 with a pre-defined pre-coding weight when the WTRU declares that the downlink physical channels are established. Once the WTRU receives a special indication by the network (e.g., Trigger 6), or when the WTRU determines that the downlink channel carrying the PCI is sufficiently reliable (e.g., Trigger 4), or after a specific timer has expired (e.g, Trigger 8), the WTRU may start transmitting in Mode 3 with full CLTD support. The WTRU may be configured in such cases to transmit the S-DPCCH only for a specific amount of time before the UE transitions to transmission Mode 3.

Figure 11B:
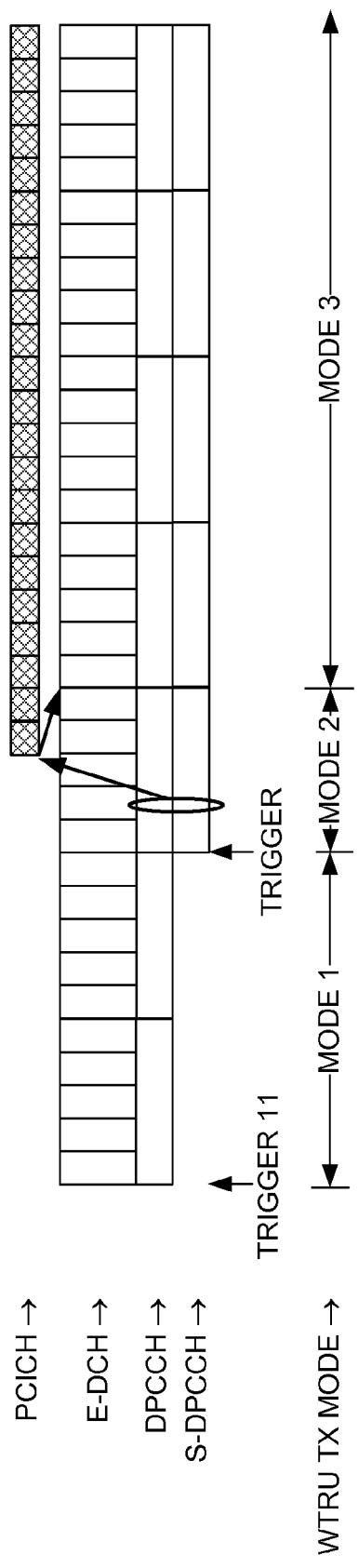
FIG. 11B shows another example method of transmission mode going to CELL_DCH state, where the WTRU operates in Mode 1, Mode 2 and Mode 3.

FIG. 11B shows another example transmission mode going to CELL_DCH. The WTRU may transmit in Mode 1 (no transmit diversity) until a relevant Trigger is detected (i.e. Trigger 4, 6 or 8 for instance). Then the WTRU may transmit the S-DPCCH for a specific period of time (essentially operating in transmission Mode 2) before fully operating in Mode 3.

In another embodiment, the WTRU is configured to use post-verification, and the WTRU may start transmission immediately when the physical dedicated channel establishment is initiated by the WTRU. In this scenario, before the post verification period elapses, the WTRU assumes that the downlink physical channel is established.

Since the quality of the downlink channel is not verified before initiating uplink transmission, there could be negative impact on the uplink performance due to potentially low feedback channel reliability if the normal CLTD mode were applied before the physical downlink channel is established.

In one approach, transmit diversity is not applied before the downlink physical channel is established and post-verification has been confirmed (or has not failed after 40 ms of the period of the first phase of the downlink synchronization) (i.e., Trigger 3). In this approach, the S-DPCCH may be transmitted before that time such that the Node-B can determine the precoding weight vector to be used after post verification is confirmed.

Figure 12A:
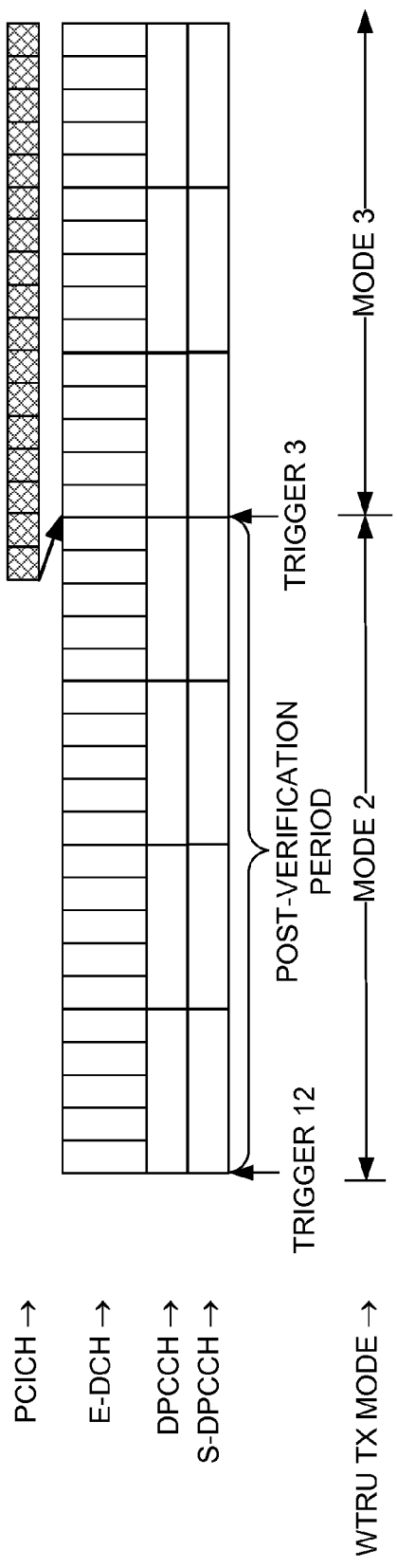
FIG. 12A shows another example method of transmission mode change when a post-verification period is configured, where the WTRU operates in Mode 2 and Mode 3.

FIG. 12A shows an example for a transmission mode change relative to a post-verification period. The WTRU may transmit both DPCCH and S-DPCCH with a pre-defined precoding vector (Mode 2) until post-verification is confirmed (Trigger 3), after which the WTRU transmits in normal CLTD mode (Mode 3). The pre-defined precoding vector may be, for example, a special vector that may be used only during post-verification period, or alternatively a precoding vector that is part of the normal precoder codebook. In one example, the precoder is selected such that the DPCCH and other uplink physical channels are transmitted on the first antenna and the S-DPCCH on the second antenna (e.g., [1 0] and [0 1] vectors). For more transmit power efficiency, the S-DPCCH may be gated and its transmit power may be scaled down with respect to DPCCH transmit power.

Figure 12B:
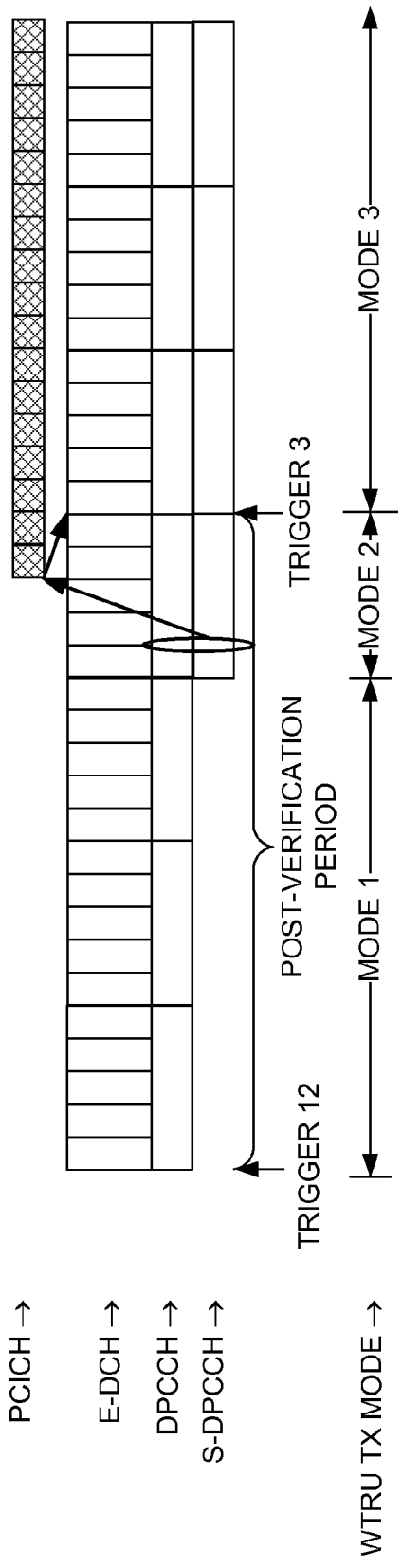
FIG. 12B shows an example method of transmission mode change when a post-verification period is configured, where the WTRU operates in Mode 1, Mode 2 and Mode 3.

FIG. 12B shows an alternative method where the S-DPCCH is only transmitted shortly or a fixed amount of time before Trigger 3 to allow Node-B estimation of the channel.

FIG. 13 shows an example for a transmission mode change occurring during the post verification period. The WTRU may transmit using a normal CLTD mode during the post verification period. Therefore, when the downlink channel quality may be superior, the UL transmission delay may be minimized. The WTRU may use pre-configured precoding weights for initialization or alternatively may monitor the channel carrying the PCI and use those weights as signaled by the Node-B, in which case the Node-B may have to signal PCI weights without having received WTRU pilots yet, thereby signalling arbitrary weights for a few slots or sub frame.

In another embodiment, during the post verification period, the WTRU transmits using Mode 1.

For the above cases related to the post verification period, if the post-verification fails, the WTRU may stop uplink transmission and resumes transmission only when the higher layers determine that the downlink physical channel is established. The WTRU may then revert back to the cases described above in which neither post verification nor power control preamble is configured.

In another embodiment, WTRU is configured to use a power control preamble. WTRU may not transmit on the uplink physical channel until a predefined amount of uplink DPCCH power control preamble radio frames have been transmitted.

FIG. 14 shows an example transmission mode change based on the power control preamble. The WTRU may transmit DPCCH and S-DPCCH during the power control preamble, each on a different antenna or using a pre-defined precoding weight. The WTRU may start using the transmitted weights on the PCI channel after it has completed transmission of the power control preamble. The signals should be fairly reliable as power control should be stabilized in both directions.

Figure 15:
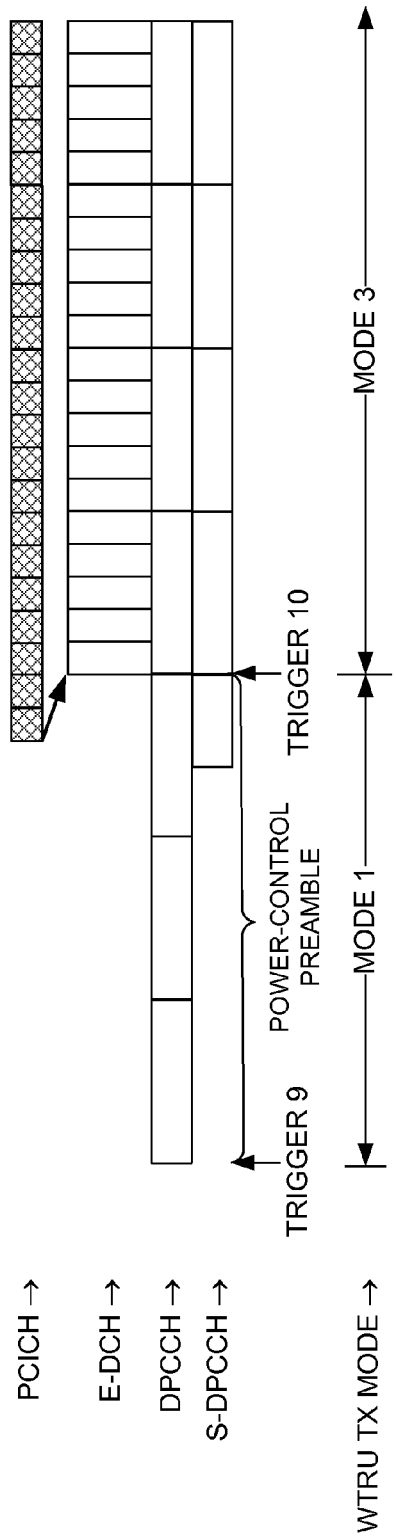
FIG. 15 shows another example method of transmission mode change following a power control preamble.

FIG. 15 shows another example transmission mode change based on the power control preamble. The WTRU may transmit non-precoded DPCCH on one antenna during the power control preamble. Transmission in Mode 3 may start once transmission of the power control preamble has completed. Optionally, the WTRU may be configured to start transmission of the S-DPCCH shortly before the end of the power-control preamble to allow the Node-B to perform channel estimation. In such cases, the WTRU may use a pre-defined precoder for the DPCCH and S-DPCCH (e.g., in one example the DPCCH and S-DPCCH may be transmitted on the main and secondary antenna, respectively).

Figure 16:
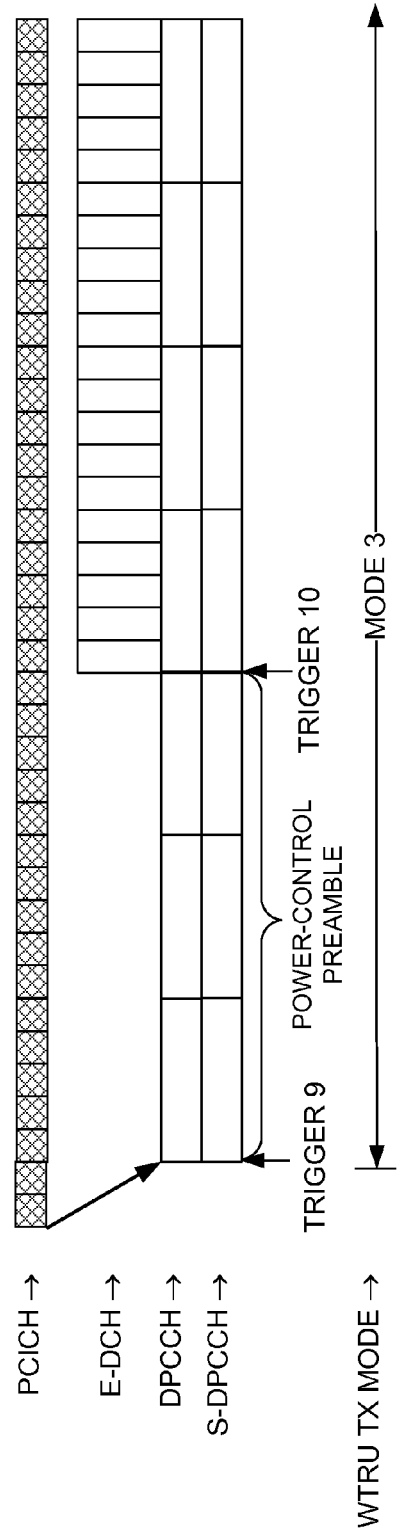
FIG. 16 shows an example method of transmission mode at the start of a power control preamble.

FIG. 16 shows an example of the WTRU transmitting both DPCCH and S-DPCCH, both of which are pre-coded using the PCI signaled from downlink from the start of the power control preamble. In this method the Node-B signals arbitrary weights (or weights not necessarily based on channel estimates) for a few slots or subframes before it has a sufficiently reliable channel estimate to signal appropriate weights.

Figure 17:
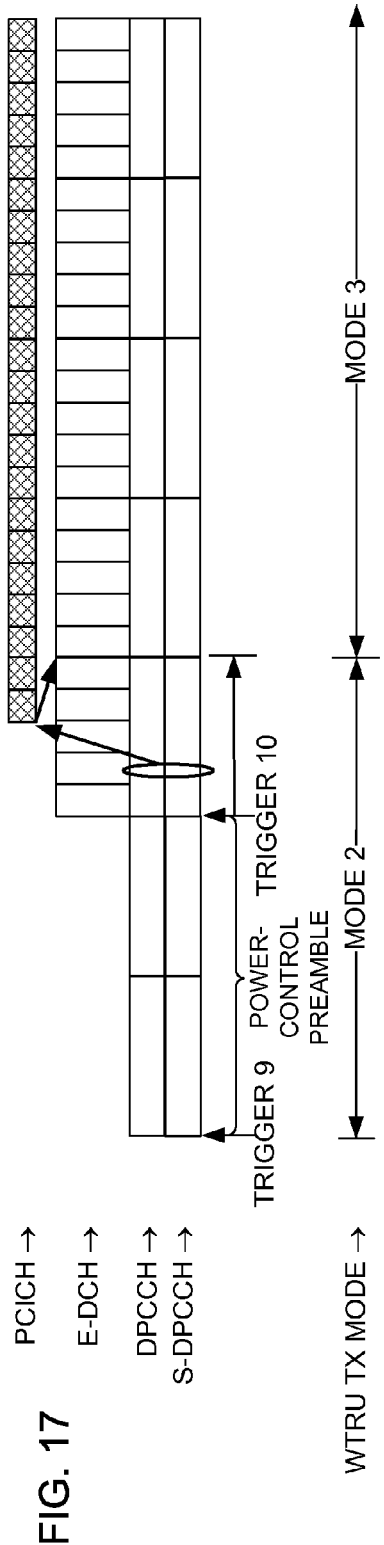
FIG. 17 shows another example method of transmission mode change following a power control preamble.

FIG. 17 shows an example of the WTRU operating in transmission Mode 2 transmitting both the DPCCH and the S-DPCCH during the PC preamble phase from the start of uplink transmission (Trigger 9) using a preconfigured precoding weight. After a specific amount of time after starting uplink transmission on the E-DCH (or DCH) (Trigger 10), the WTRU may start operating in UL CLTD (transmission Mode 3). The time duration between the end of the PC preamble phase and the start of UL CLTD operations may be pre-defined in the specifications, or configured via higher layer signaling (e.g. RRC signaling) from the network. The WTRU may receive this configuration within a RRC configuration message.

There may be several WTRU behaviors when a downlink PCI of inferior quality is detected. If the PCI transmitted from the downlink is not reliable, it may be detrimental to the uplink power control loop in which the uplink transmitted power could be mistakenly increased. This would cause not only excessive power consumption at the WTRU, but also create an unnecessary noise rise at the neighboring cells. The following mechanisms for the WTRU enable detection of poor PCI received quality. The following rules govern the related WTRU behavior.

The WTRU may detect and monitor the quality of PCI according to the following. In one approach, the WTRU may use an approach similar to the conventional mechanism for determining the quality of the F-DPCH. The WTRU may measure the quality of the PCH and if the quality is below a predefined threshold for a certain period of time, the WTRU may declare the PCI to be unreliable. Likewise, when the quality of the PCI is above a second threshold for another predefined period of time, the WTRU may declare the PCI to be reliable. The threshold values may be pre-defined and may be fixed in the specifications or configured. The two quality thresholds may be different from each other.

When the PCI quality becomes poor or better, the WTRU may change how the uplink precoding weights are used. The following methods may be used in any order or combination in such a situation.

In one embodiment shown in FIG. 19, the method 1900 may include generating a precoded dual-stream cdma signal at a WTRU using predetermined precoder weights as depicted in block 1902. The dual-stream CDMA signal may include at least a control channel in a first stream and a pilot signal channel (also a type of control signal) in a second stream, or a control channel and a data channel in a first stream and a pilot-control signal channel in a second stream. Other combinations are also possible.

The predetermined weights are determined by the WTRU in that a default set of weights is prearranged for use. The predetermined precoder weights comprise a first weight and a second weight that are applied to the first stream and a third weight and a fourth weight that are applied to the second stream. The predetermined weights may be any set of weights, and may be a set that is identical to a set contained in the precoder codebook that is used in the closed loop mode of operation. The predetermined set is thus a set that is selected without reference to, or in response to the measured channel characteristics. The dual stream may be generated using the WTRU 1800 shown in FIG. 18. The precoded dual-stream cdma signal is then transmitted by the WTRU. The precoder feedback information is then received on a precoder control information channel (e.g., PCICH) at the WTRU as depicted in block 1904. The resource information corresponding to the precoder control information channel may be sent to the WTRU, e.g., in a configuration message such as an RRC configuration or RRC reconfiguration message. The resource information may include a channelization code and a slot format.

The PCICH may use a channel format similar to that used for the Fractional-Dedicated-Physical-CHannel (F-DPCH). The WTRU may then determine a quality indicator of the precoder control information channel as depicted in block 1906. The quality indicator, or reliability indicator, may be a measure of the overall reliability of the decoded/demodulated PCI information. The PCI information may be conveyed using one or more symbols, and the quality of those symbols, and/or the likelihood of them having been received error-free, may be determined using any number of techniques. For example, a signal-to-noise ratio may be calculated, or receive signal strength may be determined. These values are often used to determine, or used as a proxy for, a probability of error. Any other well-known technique, such as that used as a basis to determine signal quality measurements of the F-DPCH, may be used as a basis to generate the quality indicator. The measurements may be of the most recent PIC symbols, or of the most recent complete set of PCI symbols, or some average of received PCI symbols, At block 1908, the WTRU generates and transmits a pre-coded dual-stream cdma signal at a WTRU using feedback precoder weights determined based on the precoder feedback information when the quality indicator is above a threshold. That is, if the PCI information carrier on the PCICH is deemed reliable, and reasonably error free, by virtue of the quality indicator being above a threshold, then the precoder is configured to use the weights corresponding to the signaled PCI information. The precoder information may be a plurality of bits that are used to identify a corresponding set of weights in the precoder codebook at the WTRU. Again, the feedback precoder weights comprise a first weight and a second weight that are applied to the first stream and a third weight and a fourth weight that are applied to the second stream. The method may further include using previously received feedback information to determine precoder weights when the quality indicator drops back below the threshold. The precoder will only use newly received PCI information if that information is deemed to be reliable.

In a further embodiment shown in FIG. 20, a method 2000 comprises generating a transmit diversity signal using default precoder weights at a WTRU as shown in block 2002. The quality measurement of the precoder feedback channel PCICH, which carries the precoder feedback information is then determined at block 2004. At decision block 2006, the quality indicator is compared to a threshold, and in response, either the WTRU continues to generate the transmit diversity signal using the default precoder weights if the quality measurement is below the quality threshold as shown in block 2008, or the WTRU generates the transmit diversity signal using precoder weights based on the precoder feedback information if the quality measurement is above the quality threshold.

Figure 18:
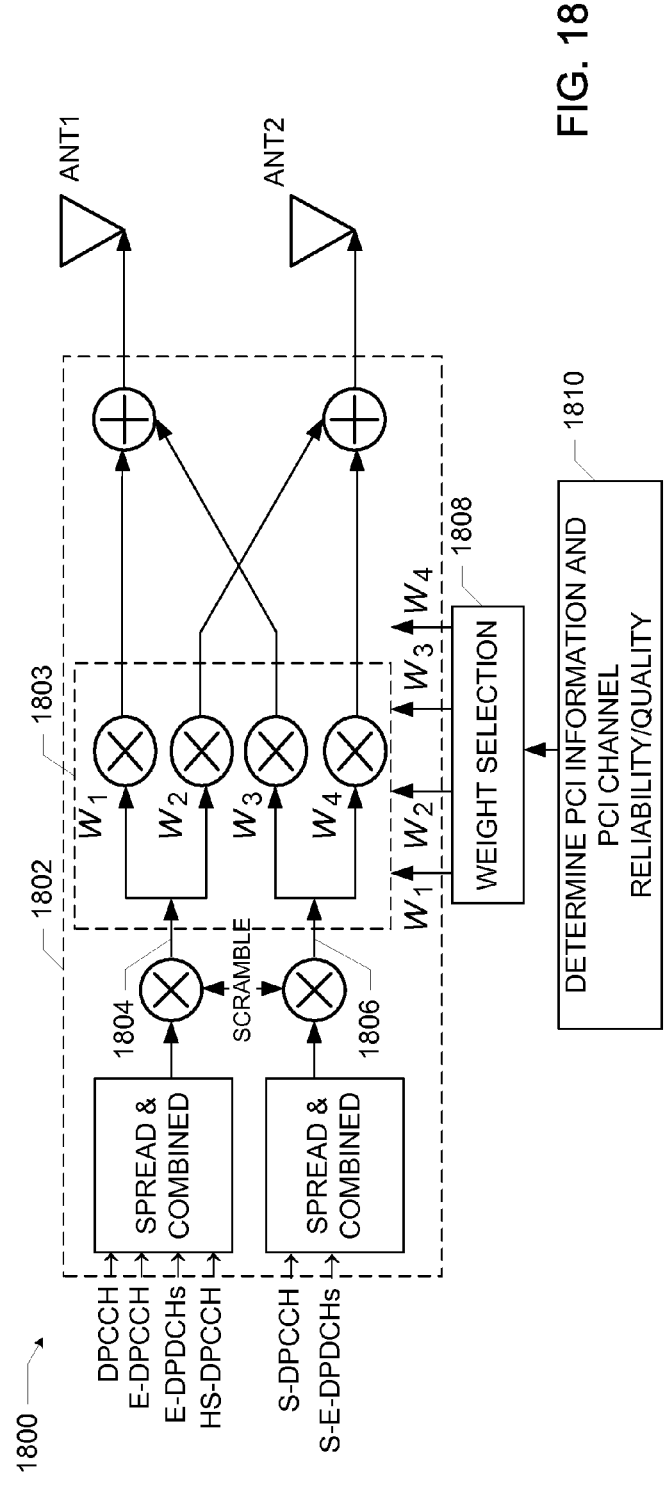
FIG. 18 is a block diagram of a WTRU apparatus.

As shown in FIG. 18, block portions of a WRTU are depicted in a configuration to implement methods described herein, including method 1900 and 2000, described above. FIG. 18 provides additional details of the WTRU depicted in FIG. 1B. The WTRU apparatus of FIG. 18 includes a dual-stream cdma signal generator 1802 that generates streams 1804 and 1806, a precoder 1803, a precoding weight selector 1808, and a precoder feedback processor 1810. The dual stream cdma signal generator 1802 is configured to carry at least a control channel in a first stream and at least a pilot signal channel in a second stream. Further, additional channels may be present in one or both streams, depending on how the WTRU is configured, as described herein.

The precoder 1803 is configured to apply precoding weights W1, W2, W3, and W4, which are provided by the precoding weight selector 1808. The precoder feedback processor 1810 is configured to determine precoder feedback information (PCI) received on a precoder control information channel (PCICH). The precoder feedback processor 1810 is also configured to determine a quality indicator of the precoder feedback channel. This may be done using the calculations described above. Further, the precoder feedback processor 1810 is configured to provide a first set of predetermined precoder weights W1-W4 to the precoder 1803 of the dual stream cdma signal generator 1802 during one stage, or mode of operation, as described above. That is, this stage may be an initial stage of CELL_DCH state, or during an initial or intermediate stage of CELL_FACH state, etc. The precoder feedback processor 1810 is also configured to provide a second set of precoder weights W1-W4 determined based on the precoder feedback information when the quality indicator is above a threshold.

The precoder feedback processor 1810 of the WTRU may be configured to determine the predetermined weights without reference to channel characteristics. That is, the predetermined weights may be a pre-agreed upon set of weights, such as a default set of weights. The WTRU may be configured to receive a parameter indicating the resource information of the precoder feedback channel PCICH. The precoder feedback processor 1810 may be configured to determine the quality indicator using a measurement method that is based on the measurement method used for determining quality of a F-DPCH Fractional-Dedicated-Physical-CHannel (F-DPCH).

The precoder feedback processor 1810 may also be further configured in some embodiments to use previously received feedback information to determine precoder weights when the quality indicator drops back below the threshold.

In an embodiment related to timer handling, the WTRU may continue to use the pre-coding weight vector indicated by the most recent PCI whose quality is reliable for a pre-defined period of time. The predefined period may be implemented via timer which may be trigged by a detection of an unreliable PCI reception and reset by a declaration of a reliable PCI reception. The value of the timer may be signaled via RRC signaling from a Node-B.

The value of timer may be signaled via RRC signaling from the network Node-B. While the value of timer may be decided by the RNC, it may also be relevant for each Node-B to determine the appropriate value based on its own power setting strategy. In one approach, the Node-B indicates to its controlling RNC the value of the timer that it prefers. This can be signalled at initialization, periodically and/or whenever this value changes.

In another approach, the RNC probes the Node-B for the timer value before configuring the UE. A similar timer could also be used when the quality of the PCI returns to acceptable levels.

The WTRU may respond to detection of inferior PCI quality according to any one or more of the following actions that may be performed in any order or combination.

The WTRU may hold the precoding weights.

The WTRU may continue to use the precoding weight vector indicated by the most recent PCI whose quality is sufficient reliable until a new or updated PCI which is deemed reliable by the WTRU, at which point the WTRU resumes normal CLTD operations.

The WTRU may Stop UL CLTD mode by autonomously disabling transmit diversity, reverting back to the conventional non-diversity mode as defined in existing standard. In this non-transmit diversity mode, the DPCCH and other existing uplink channels are not precoded and transmit on one antenna and S-DPCCH is not transmitted.

The WTRU may transmit using a pre-defined precoding weight. In one example, a special precoding weight may be used where DPCCH and other existing uplink channels are transmitted on one antenna and S-DPCCH is transmitted on the other antenna. The S-DPCCH continues to be transmitted.

The WTRU may autonomously change to one of the allowed transmit diversity configurations (UL CLTD active or not (in which case primary or secondary antenna used), S-DPCCH transmitted or not). For instance, the WTRU may be pre-configured to transmit with the secondary antenna only without S-DPCCH transmitted.

The WTRU may transmit a message to the Node-B indicating the loss of quality on the PCI channel. While it has been proposed to carry this information on the S-DPCCH, it may be more relevant to carry this information elsewhere such as in a new field of the DPCCH, or using a MAC-level message. The WTRU may use a new MAC-header where a 1-bit field would indicate whether or not the PCI is received with sufficient quality by the WTRU. When the WTRU detects that the quality of the PCI is inferior, the WTRU sets the bit to a specific value. The WTRU may then reset the bit when the PCI quality is sufficiently good. Such a field may be inserted in the MAC-e/MAC-is/i header. This solution is applicable to operations with E-DCH configured. Otherwise, when no E-DCH is configured, a new header may be inserted in the MAC-d header, and the Node-B could get this information by reading the content of the MAC-d header.

Alternatively, the WTRU may also be configured to use a different pilot sequence on the S-DPCCH when the F-PCICH quality falls below a threshold. In one approach, the alternate pilot sequence is derived from the original pilot sequence via a (simple) mathematical operation. For example, the alternate pilot sequence may be obtained by inverting the bits of the original pilot sequence. In another approach, the WTRU may use a pre-determined alternate pilot sequence fixed in the specifications.

The WTRU may transmit an RRC message to the RNC indicating the loss of PCI signal quality. The RRC message may contain additional information potentially to assist the RNC in making an appropriate decision with respect to UL CLTD operations. Additional information may include, for example, downlink signal quality (e.g. downlink Ec/No, downlink pathloss, RSCP, etc.) from serving Node-B and other Node-Bs/cells in the active set, or (in addition) in the vicinity. In a first example, the WTRU may determine autonomously which cells are in the vicinity, for instance based on quality measurement and some configured threshold. In another example, the WTRU may be configured to transmit quality information of only a subset of the cells (e.g. the WTRU may be configured to report transmission quality of a maximum of 3 cells). The WTRU may then choose to transmit the information of only the best cells. The additional information may also include estimated WTRU velocity (e.g., based on Doppler measurements or other) and/or a timestamp to indicate at which time the loss of PCI quality happened.

Note that this approach is particularly useful in the case where there is no HSDPA configured and the WTRU is not monitoring the HS-SCCH. In such cases, the Node-B has no means to reconfigure the WTRU and the information would need to be relayed to the Node-B. In one implementation of this approach, the WTRU is configured to only transmit this RRC message in case there is no HSDPA configured, or that the WTRU is not monitoring the HS-SCCH for UL CLTD activation/deactivation/configuration change orders.

The WTRU may declare radio link failure and execute the conventional actions related to RLF, potentially adding a new cause (e.g. "PCI failure") to the cell update cause IE in the CELL UPDATE RRC message.

The WTRU may respond to detection of a change from inferior PCI quality to an acceptable PCI quality (based on appropriately configured thresholds, for instance), in any one or more of following examples, in any order or combination.

The WTRU may resume UL CLTD operations, applying the indicated PCI weights on its uplink transmission.

The WTRU may transmit a message to the Node-B indicating that the PCI quality is back to acceptable levels. Similar methods as what is proposed above to indicate loss of quality to Node-B could be used as well. Similarly, the WTRU may transmit an RRC message to indicate to the network that quality of PCI has come back to an acceptable level. Additional measurements or information such as what is described above may also be included.

The WTRU may autonomously resume transmission of the S-DPCCH (for example in the case where its transmission had been interrupted).

The WTRU may autonomously change to one of the allowed pre-defined transmit diversity configurations, such as UL CLTD active or not (in which case primary or secondary antenna used), or S-DPCCH transmitted or not. For instance, the WTRU may be pre-configured to transmit with the primary antenna only with S-DPCCH transmitted.

The following is an example of combinations of the methods described above to illustrate one possible solution. In this example, the WTRU detects inferior PCI quality. Then the WTRU holds the PCI weights and starts a timer. When the timer expires, the WTRU autonomously stops transmitting the S-DPCCH and starts operating without UL CLTD (i.e., the WTRU transmits over the primary antenna only). When the WTRU detects that the PCI quality has resumed to acceptable levels, the WTRU starts a timer and initiate transmission of the S-DPCCH. When the timer expires, the WTRU starts operating in normal UL CLTD operations, applying the weights as indicated by the Node-B on the DL.

The following examples relate to network actions in response to PCI quality. In a first example, the Node-B detects if the WTRU receives the PCI with inferior quality by monitoring the changes in channel with the PCI it indicates on the downlink. This approach may be used in combination to assisted techniques where the WTRU also indicates to the Node-B the status of the PCI link quality.

When the Node-B detects that the WTRU receives the PCI with inferior quality it may indicate it to the RNC. This may be achieved for example via a new Iub message. This message may contain a status flag indicating that the WTRU receives the PCI with inferior quality (or the message itself may carry this information) with optional additional information. Such additional information may include information that could help RNC manage UL CLTD information. Such information may include, for instance: the WTRU headroom (as signalled over the UPH field in the SI), WTRU velocity (as estimated by the Node-B), etc.

In another example, the loss of PCI quality is indicated to the network by the WTRU. Once the RNC receives the RRC message indicating that the WTRU is receiving the PCI with inferior quality, it may further indicate to the serving Node-B that the WTRU is receiving the PCI with inferior quality and may take the appropriate action (e.g. disable UL CLTD, change serving Node-B, etc.). The Node-B may also take further actions for instance by changing the UL CLTD configuration via HS-SCCH order and/or increasing the PCI transmitted power.

The following examples relate to network actions in response to PCI quality resuming to acceptable level at WTRU. In a first example, the Node-B detects the PCI quality resuming to acceptable levels via indication by the WTRU. In this situation, the Node-B is directly aware of the PCI quality status at the WTRU and may reconfigure the WTRU appropriately. For instance, the serving Node-B may activate back UL CLTD operations.

The serving Node-B may also inform the RNC of the change in situation for example via a new Iub signal. This signal may contain, in addition to the PCI quality status, additional information to help RNC make appropriate configuration decisions. Such additional information may include, for instance: the WTRU headroom (as signalled over the UPH field in the SI), WTRU velocity (as estimated by the Node-B), etc.

In another example, the PCI quality resumes to acceptable levels as indicated by the WTRU to RNC. When the RNC is made aware via RRC signalling from the WTRU that the quality of the PCI has resumed to normal levels, it may indicate the change of status to the serving Node-B (e.g., via Iub signalling). The Node-B may then take further actions, for instance it may reconfigure the WTRU with an HS-SCCH order to resume UL CLTD operations.

In further embodiments, methods may include using uplinks in a closed loop transmit diversity while operating with an enhanced dedicated channel (E-DCH) or a dedicated channel (DCH) in a cell forward access channel (CELL_FACH) state and idle mode operations. These methods may comprise: requesting access to network resources; determining network capability for supporting transmit diversity; and determining based on the network capability whether to apply transmit diversity. The method may include using a random access channel (RACH) to request access to network resources, or to support the E-DCH. The WTRU may configure the uplink transmit diversity based on a network configuration of a random access channel (RACH) partitioning.

The WTRU may also indicate in a radio resource controller (RRC) signal whether or not it supports uplink (UL) CLTD transmission in CELL_FACH state. The network may also signal via an information element (IE) its uplink (UL) CLTD capabilities. And alternatively, the WTRU may read the system information block (SIB) to determine if a cell supports uplink (UL) CLTD in CELL_FACH, CELL_DCH mode, or idle mode.

The WTRU may use a combination of criteria to determine whether to use uplink (UL) CLTD in CELL_FACH state. The WTRU may use an E-DCH radio network temporary identifier (E-RNTI) to determine whether to use uplink (UL) CLTD in CELL_FACH state, or a high speed downlink shared channel (HS-DSCH) radio network transaction identifier (H-RNTI), or a cell radio network temporary identifier (C-RNTI) to determine whether to use uplink (UL) CLTD in CELL_FACH state. In some embodiments, the WTRU does not use a uplink (UL) CLTD to transmit a CELL UPDATE to a network.

The method may provide one or more information elements that indicate whether the WTRU uses uplink (UL) CLTD. The resource index is provided to the WTRU. The WTRU may receive information regarding a Precoding Control Indication Channel (PCICH). The WTRU may also receive an indication from a Node-B that indicates operation in uplink (UL) CLTD mode. The WTRU may also receive an indication to use uplink (UL) CLTD after a collision resolution completes.

The methods may also include the WTRU selecting a transmission mode in which the WTRU applies an open loop transmit diversity by pre-coding a dedicated physical control channel, an enhanced dedicated channel, or a high-speed dedicated physical control channel, with a first pre-coding weight, and transmitting a secondary pilot control channel or a secondary dedicated physical control channel with a second pre-coded weight. The WTRU may then monitor a downlink pre-coded control information (PCI) but does not apply the weights that are signaled.

The WTRU may operate with space-time transmit diversity. The WTRU may then select another transmission mode in which the WTRU applies a full closed loop transmit diversity by pre-coding a dedicated physical control channel, an enhanced dedicated channel, or a high-speed dedicated physical control channel, with a first pre-coding weight; and the WTRU monitors the downlink PCI and applies the weights that are signaled. The WTRU may use a predefined pre-coding vector until a first PCI is received, or until a first PCI deemed to be reliable, or of sufficient quality is received.

Thus, the WTRU may use open loop transmit diversity (OLTD) upon starting transmission. Conversion to CLTD may be based on a trigger such as a collision resolution trigger. The WTRU may use a predetermined precoder weight on a condition that a precoding control indicator channel (PCICH) of inferior quality is detected. The WTRU may switch to the signaled precoder weights when the signal quality of the indicator channel is sufficient. Furthermore, in response to subsequently detecting inferior PCI quality, the WTRU may continue to use previously signaled pre-coding weights for a predefined time period. The time period may be determined using a timer triggered by the detected inferior PCI quality, or may simply be until reliable PCI data is received. That is, in response to the detection of inferior PCI quality, the WTRU performing at least one of: holding the pre-coding weights; using the pre-coding weight vector indicated by a recent PCI with acceptable quality; stopping the closed loop transmit diversity transmission mode; or reverting to non-transmit diversity mode.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the described methods.

No element, act, or instruction used in the description of the present application should be construed as critical or essential to the invention unless explicitly described as such. Also, as used herein, each of the articles "a" and "an" are intended to include one or more items. Where only one item is intended, the terms "a single" or similar language is used. Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

What is claimed is:

1. A method implemented in a Wireless Transmit Receive Unit (WTRU) comprising:
   upon entering a transmit diversity mode, generating and transmitting a dual-stream cdma signal using predetermined precoder weights;
   receiving precoder feedback information on a precoder control information channel;
   determining a quality indicator of the precoder control information channel; and,
   when the quality indicator is above a threshold, generating and transmitting the dual-stream cdma signal using precoder weights determined based on the precoder feedback information.

2. The method of claim 1 wherein the predetermined weights are determined without reference to channel characteristics.

3. The method of claim 1 further comprising receiving a parameter indicating the resource information of the precoder control information channel.

4. The method of claim 3 wherein the resource information is a channelization code and a slot format.

5. The method of claim 1 wherein the quality indicator is based on one of a signal-to-noise ratio, an error probability, or a signal strength indicator.

6. The method of claim 1 wherein the dual-stream CDMA signal includes a control channel in a first stream and a pilot signal channel in a second stream.

7. The method of claim 1 wherein the dual-stream CDMA signal includes a control channel and a data channel in a first stream and a pilot signal channel in a second stream.

8. The method of claim 7 wherein the predetermined precoder weights and the feedback precoder weights each comprise a first weight and a second weight that are applied to the first stream and a third weight and a fourth weight that are applied to the second stream.

9. The method of claim 1 wherein the quality indicator is based on the most recent precoder feedback information.

10. The method of claim 1 wherein the quality indicator is determined using a measurement method that is based on the measurement method used for determining quality of a F-DPCH FrActional-Dedicated-Physical-CHannel (F-DPCH).

11. The method of claim 1 further comprising using previously received feedback information to determine precoder weights when the quality indicator drops back below the threshold.

12. A wireless transmit-receive unit (WTRU) apparatus comprising:
   a dual-stream cdma signal generator having a precoder configured to apply precoding weights;
   a precoder feedback processor configured to (i) determine precoder feedback information received on a precoder control information channel, (ii) determine a quality indicator of the precoder control information channel; and, (iii) upon entering a transmit diversity mode and before the quality indicator of the precoder control information channel is above a threshold, provide a first set of predetermined precoder weights to the dual stream cdma signal generator and, when the quality indicator is above the threshold, subsequently provide a second set of precoder weights determined based on the precoder feedback information.

13. The apparatus of claim 12 wherein the precoder feedback processor is configured to determined the predetermined weights without reference to channel characteristics.

14. The apparatus of claim 12 wherein the WTRU is further configured to receive a parameter indicating the resource information of the precoder control information channel.

15. The apparatus of claim 12 wherein dual stream cdma signal generator is configured to carry at least a control channel in a first stream and at least a pilot signal channel in a second stream.

16. The apparatus of claim 12 wherein the precoder feedback processor is configured to determine the quality indicator using a measurement method that is based on the measurement method used for determining quality of a F-DPCH FrActional-Dedicated-Physical-CHannel (F-DPCH).

17. The apparatus of claim 12 wherein the precoder feedback processor is further configured to use previously received feedback information to provide precoder weights when the quality indicator drops back below the threshold.

18. A method implemented in a Wireless Transmit Receive Unit (WTRU) comprising:
   upon entering a transmit diversity mode, generating a transmit diversity signal using default precoder weights; and,
   obtaining a quality measurement of a precoder feedback channel carrying precoder feedback information; and
   in response to the quality measurement and a quality threshold:
   (i) continuing to generate the transmit diversity signal using the default precoder weights if the quality measurement is below the quality threshold; and,
   (ii) generating the transmit diversity signal using precoder weights based on the precoder feedback information if the quality measurement is above the quality threshold.

* * * * *